United States Patent
Li

(10) Patent No.: US 11,985,635 B2
(45) Date of Patent: *May 14, 2024

(54) WIRELESS COMMUNICATION METHOD, SYSTEM, NETWORK DEVICE, AND USER EQUIPMENT FOR IMPROVING TRANSMISSION PERFORMANCE

(71) Applicant: HUAWEI TECHNOLOGIES CO., LTD., Shenzhen (CN)

(72) Inventor: Chao Li, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 300 days.

This patent is subject to a terminal disclaimer.

(21) Appl. No.: 17/366,214

(22) Filed: Jul. 2, 2021

(65) Prior Publication Data

US 2021/0345325 A1 Nov. 4, 2021

Related U.S. Application Data

(63) Continuation of application No. 15/901,572, filed on Feb. 21, 2018, now Pat. No. 11,082,971, which is a
(Continued)

(51) Int. Cl.
*H04W 72/0446* (2023.01)
*H04L 5/00* (2006.01)
(Continued)

(52) U.S. Cl.
CPC ....... *H04W 72/0446* (2013.01); *H04L 5/0048* (2013.01); *H04L 5/0053* (2013.01);
(Continued)

(58) Field of Classification Search
CPC . H04W 72/0446; H04W 72/04; H04W 72/21; H04W 72/23; H04W 88/02;
(Continued)

(56) References Cited

U.S. PATENT DOCUMENTS

2010/0202373 A1 8/2010 Chun et al.
2011/0032894 A1 2/2011 Miki et al.
(Continued)

FOREIGN PATENT DOCUMENTS

CN 101675692 A 3/2010
CN 101932096 A 12/2010
(Continued)

OTHER PUBLICATIONS

Huawei, Hisilicon, "PUCCH transmission for TDD-FDD CA", 3GPP TSG RAN WG1 Meeting #75, R1-135023,San Francisco, USA, Nov. 11-15, 2013, total 5 pages.
(Continued)

*Primary Examiner* — Ivan O Latorre

(74) *Attorney, Agent, or Firm* — Maier & Maier, PLLC

(57) ABSTRACT

A wireless communications method and system, a network device, and user equipment. The method includes: sending, by a network device, resource configuration information to user equipment, where the resource configuration information is used to indicate a first transmission resource corresponding to first transmission, and duration of a transmission resource occupied by one transmission of the first transmission is less than 1 millisecond; and communicating, by the network device, with the user equipment based on the first transmission resource. In this way, a transmission delay can be shortened, user experience can be greatly improved, and performance of a wireless network can be greatly enhanced.

16 Claims, 30 Drawing Sheets

Related U.S. Application Data continuation of application No. PCT/CN2015/087740, filed on Aug. 21, 2015.

(51) Int. Cl.

| | | |
|---|---|---|
| *H04L 5/14* | (2006.01) | |
| *H04W 72/04* | (2023.01) | |
| *H04W 72/21* | (2023.01) | |
| *H04W 72/23* | (2023.01) | |
| *H04W 88/02* | (2009.01) | |

(52) U.S. Cl.
CPC .......... *H04L 5/1469* (2013.01); *H04W 72/04* (2013.01); *H04W 72/21* (2023.01); *H04W 72/23* (2023.01); *H04L 5/0007* (2013.01); *H04W 88/02* (2013.01)

(58) Field of Classification Search
CPC ... H04L 5/0048; H04L 5/0053; H04L 5/1469; H04L 5/0007
See application file for complete search history.

(56) References Cited

U.S. PATENT DOCUMENTS

| | | | |
|---|---|---|---|
| 2011/0128909 | A1 | 6/2011 | Luo et al. |
| 2012/0033603 | A1 | 2/2012 | Seo et al. |
| 2012/0275415 | A1 | 11/2012 | Wang et al. |
| 2013/0058282 | A1 | 3/2013 | Miki et al. |
| 2013/0084910 | A1 | 4/2013 | Suzuki et al. |
| 2013/0114525 | A1 | 5/2013 | Ahmadi |
| 2014/0126404 | A1 | 5/2014 | Kim et al. |
| 2014/0328227 | A1 | 11/2014 | Wang |
| 2015/0043488 | A1 | 2/2015 | Hakola et al. |
| 2015/0163783 | A1 | 6/2015 | Kim et al. |
| 2015/0188650 | A1 | 7/2015 | Au et al. |
| 2015/0334685 | A1 | 11/2015 | Ji et al. |
| 2016/0057753 | A1* | 2/2016 | Yang ............ H04L 5/0051 370/336 |
| 2016/0165622 | A1 | 6/2016 | Luo et al. |
| 2016/0309466 | A1 | 10/2016 | Chen et al. |
| 2017/0019882 | A1 | 1/2017 | Nimbalker et al. |
| 2017/0019886 | A1 | 1/2017 | Patel et al. |
| 2018/0035430 | A1 | 2/2018 | Futaki |
| 2018/0049165 | A1* | 2/2018 | Byun ............ H04W 72/04 |
| 2018/0098337 | A1 | 4/2018 | Lee et al. |
| 2018/0109994 | A1* | 4/2018 | Lee ............ H04W 48/12 |
| 2018/0167958 | A1 | 6/2018 | Yang et al. |
| 2018/0206232 | A1 | 7/2018 | Takeda et al. |
| 2018/0206266 | A1* | 7/2018 | Byun ............ H04W 72/20 |
| 2018/0213530 | A1 | 7/2018 | Mochizuki et al. |
| 2018/0227958 | A1 | 8/2018 | Xiong et al. |
| 2018/0234998 | A1 | 8/2018 | You et al. |
| 2018/0241524 | A1 | 8/2018 | Andersson et al. |
| 2019/0007934 | A1 | 1/2019 | Wang et al. |

FOREIGN PATENT DOCUMENTS

| | | | |
|---|---|---|---|
| CN | 101989904 | A | 3/2011 |
| CN | 102017693 | A | 4/2011 |
| CN | 102111893 | A | 6/2011 |
| CN | 102143586 | A | 8/2011 |
| CN | 102573045 | A | 7/2012 |
| CN | 102932838 | A | 2/2013 |
| CN | 103023627 | A | 4/2013 |
| CN | 103974418 | A | 8/2014 |
| CN | 103997788 | A | 8/2014 |
| CN | 104080180 | A | 10/2014 |
| CN | 104185960 | A | 12/2014 |
| CN | 104518859 | A | 4/2015 |
| CN | 104619003 | A | 5/2015 |
| CN | 104782066 | A | 7/2015 |
| CN | 104255077 | B | 11/2018 |
| EP | 2744285 | A1 | 6/2014 |
| EP | 2 894 822 | A1 | 7/2015 |
| JP | 2009212597 | A | 9/2009 |
| JP | 2016519485 | A | 6/2016 |
| JP | 2016521033 | A | 7/2016 |
| JP | 2017510108 | A | 4/2017 |
| JP | 2018520591 | A | 7/2018 |
| KR | 20100124783 | A | 11/2010 |
| KR | 20120093997 | A | 8/2012 |
| KR | 20130028106 | A | 3/2013 |
| KR | 1020130054217 | A | 5/2013 |
| KR | 20140048277 | A | 4/2014 |
| KR | 20140090253 | A | 7/2014 |
| WO | 2014105387 | A1 | 7/2014 |
| WO | 2014155198 | A2 | 10/2014 |
| WO | 2014161142 | A1 | 10/2014 |
| WO | 2014172876 | A1 | 10/2014 |
| WO | 2015021399 | A1 | 2/2015 |
| WO | 2015096281 | A1 | 7/2015 |
| WO | 2015096821 | A1 | 7/2015 |
| WO | 2016208994 | A1 | 12/2016 |
| WO | 2017014074 | A1 | 1/2017 |
| WO | 2017026159 | A1 | 2/2017 |

OTHER PUBLICATIONS

Ericsson, Huawei, New SI Proposal: Study on Latency reduction techniques for LTE. 3GPP TSG RAN Meeting # 67 Shanghai, China, Mar. 9-12, 2015, RP-150465, 8 pages.

3GPP TS 36.211 V12.6.0 "3rd Generation Partnership Project; Technical Specification Group Radio Access Network; Evolved Universal Terrestrial Radio Access (E-UTRA); Physical channels and modulation(Release 12)", technical Specification, 2015-16, 136 pages.

"3GPP TS 36.212 V12.5.0 3rd Generation Partnership Project; Technical Specification Group Radio Access Network; Evolved Universal Terrestrial Radio Access (E-UTRA); Physical layer procedures(Release 12), Technical Specification, Jun. 2015, 241 pages".

"3GPP TS 36.212 V12.5.0 3rd Generation Partnership Project; Technical Specification Group Radio Access Network; Evolved Universal Terrestrial Radio Access (E-UTRA); Radio Resource Control (RRC); Protocol Specification(Release 12), Technical Specification, Jun. 2015, 449 pages".

Intel Corporation, Discussion on TTI Shortening [online], 3GPP TSG-RAN WG1#83 R1-156540, 4 pages.

LG Electronics, Discussion on specification impact for latency reduction techniques [online], 3GPP TSG-RAN WG1#83 R1-156902, 6 pages.

3GPP TSG RAN WG1 Meeting # 74, R1-133451: "HARQ Design for eIMTA", NTT Docomo, Barcelona, Spain, Aug. 19-23, 2013, total 7 pages.

Young-Han Nam et al., "Evolution of reference signals for LTE-advanced systems", IEEE Communications Magazine, vol. 50, No. 2, Feb. 1, 2012, XP011417049, pp. 132-138.

Huawei et al., "Motivation of New SI Proposal Latency Reduction", 3GPP Draft, RP-150238, vol. TSG RAN, Shanghai, China; Mar. 9, 2015-Mar. 12, 2015, Mar. 3, 2015, XP050932028, 12 pages.

3GPP TS 36.212 V12.6.0 "3rd Generation Partnership Project; Technical Specification Group Radio Access Network; Evolved Universal Terrestrial Radio Access (E-UTRA); Multiplexing and channel coding(Release 12)", Technical Specification, Jun. 2015, 94 pages.

TD Tech, "Resource allocation method analysis of Enhanced Uplink for CELL_FACH state", R1-081346, 3GPP TSG-RAN WG1 Meeting #52bis, Shenzhen, China, Mar. 31-Apr. 4, 2008, 3 pages.

* cited by examiner

S1200

Send second resource indication information to user equipment, so that the user equipment receives downlink data in a first subframe determined according to the second resource indication information, where the first subframe is one of subframes occupied by a first transmission resource — S1205

Send the downlink data to the user equipment in the first subframe — S1206

Send configuration information to user equipment — S1207

Receive a demodulation reference signal DMRS that is sent by the user equipment on a transmission resource in a first transmission resource according to the configuration information — S1208

| Receive uplink control channel resource indication information sent by a network device, where the uplink control channel resource indication information indicates a time domain symbol location and a frequency domain location in a first subframe that are of an uplink control channel related to first transmission, and the first subframe is one of subframes occupied by a first transmission resource | S1209 |

| Receive, in the first subframe, uplink control information that is related to the first transmission and that is sent by user equipment according to the uplink control channel resource indication information | S1210 |

| User equipment receives resource configuration information sent by a network device, where the resource configuration information is used to indicate a first transmission resource corresponding to first transmission, and duration of a transmission resource occupied by one transmission of the first transmission is less than 1 ms | S3100 |

| The user equipment communicates with the network device based on the first transmission resource | S3200 |

```
┌─────────────────────────────────────────────────────────────┐
│ Receive resource configuration information sent by a        │
│ network device, where the resource configuration            │──── S3100
│ information is used to indicate a first transmission        │
│ resource corresponding to first transmission, and duration  │
│ of a transmission resource occupied by one transmission of  │
│ the first transmission is less than 1 ms                    │
└─────────────────────────────────────────────────────────────┘
                              │
┌─────────────────────────────────────────────────────────────┐
│ Receive first resource indication information sent by the   │──── S3201
│ network device                                              │
└─────────────────────────────────────────────────────────────┘
                              │
┌─────────────────────────────────────────────────────────────┐
│ Send uplink data to the network device in a first subframe, │
│ in a radio frame, determined according to the first         │──── S3202
│ resource indication information, where the first subframe   │
│ in the radio frame is one of subframes occupied by the      │
│ first transmission resource                                 │
└─────────────────────────────────────────────────────────────┘
                              │
┌─────────────────────────────────────────────────────────────┐
│ Send retransmission data to the network device at an        │──── S3500
│ interval of third duration from a moment at which feedback  │
│ information is received                                     │
└─────────────────────────────────────────────────────────────┘
```

Receive uplink control channel resource indication information sent by a network device, where the uplink control channel resource indication information indicates a time domain symbol location and a frequency domain location in a first subframe that are of an uplink control channel related to first transmission, and the first subframe is one of subframes occupied by a first transmission resource ⎯ S3207

Send, in the first subframe according to the uplink control channel resource indication information, uplink control information related to the first transmission to the network device ⎯ S3208

A network device sends configuration information to user equipment ⎯ S4100

The network device receives a demodulation reference signal DMRS that is generated according to the configuration information and that is sent by the user equipment, where all time domain symbols included in a subframe in which a time domain symbol used by the user equipment to generate the DMRS is located are allocated to M user equipments, and M is an integer not less than 2 ⎯ S4200

FIG. 18

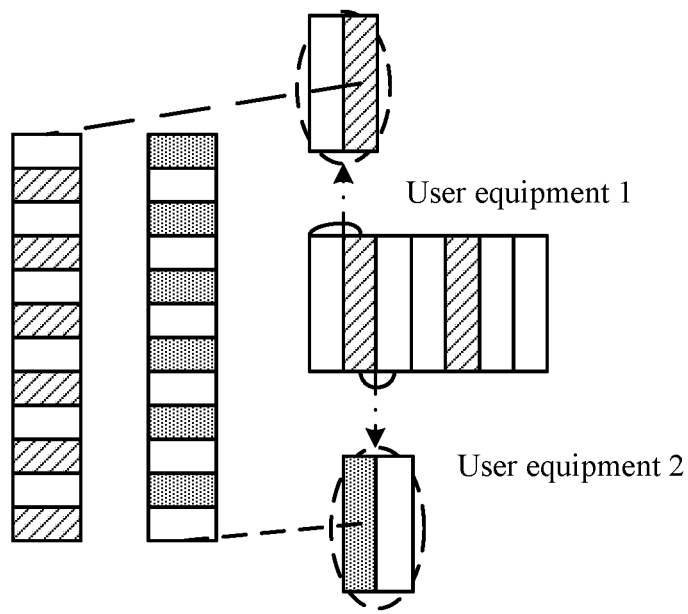

| S4100 | A network device sends configuration information to user equipment |

| S4200 | The network device receives a demodulation reference signal DMRS that is generated according to the configuration information and that is sent by the user equipment, where all time domain symbols included in a subframe in which a time domain symbol used by the user equipment to generate the DMRS is located are allocated to M user equipments, and M is an integer not less than 2 |

| S4300 | The network device sends DMRS transmit power indication information to the user equipment |

| User equipment obtains a resource occupied by an uplink control channel related to first transmission, where duration of a resource occupied by one transmission of the first transmission is less than 1 ms | S7100 |

| The user equipment sends, on the resource occupied by the uplink control channel related to the first transmission, uplink control information related to the first transmission to a network device | S7200 |

| User equipment receives resource indication information sent by a network device | S7300 |

| Obtain, according to the resource indication information, a resource occupied by an uplink control channel related to first transmission | S7100 |

| Send, on the resource occupied by the uplink control channel related to the first transmission, uplink control information related to the first transmission to the network device | S7200 |

FIG. 27

WIRELESS COMMUNICATION METHOD, SYSTEM, NETWORK DEVICE, AND USER EQUIPMENT FOR IMPROVING TRANSMISSION PERFORMANCE

CROSS-REFERENCE TO RELATED APPLICATIONS

This application is a continuation of U.S. patent application Ser. No. 15/901,572, filed on Feb. 21, 2018, which is a continuation of International Application No. PCT/CN2015/087740, filed on Aug. 21, 2015. All of the afore-mentioned patent applications are hereby incorporated by reference in their entireties.

TECHNICAL FIELD

The embodiments relate to the communications field, and more specifically, to a wireless communications method and system, a network device, and user equipment.

BACKGROUND

In the Long Term Evolution (LTE) protocol, as shown in FIG. 1 and FIG. 2, frame structures are classified into a frequency division duplex (FDD) frame structure and a time division duplex (TDD) frame structure. A basic unit of the two types of frame structures is as follows: One 1 ms subframe includes two timeslots, and each timeslot occupies 0.5 ms. One radio frame occupies 10 ms. During transmission, a minimum time unit used for sending data is a 1 ms subframe. That is, in a transmission process, resource mapping needs to be performed, in a 1 ms time unit, on data to be received and sent by particular user equipment, and data generated after the mapping is transmitted in a 1 ms subframe. Further, in a design of an entire LTE system, on a UE side, in consideration of a limitation on a receiving delay and a processing delay of a maximum data packet in 1 ms, after receiving data in a subframe n, user equipment can perform corresponding sending only in a subframe n+k, where k≥4. Therefore, a round trip time (RTT) not less than 8 ms is required in one uplink transmission during which a base station schedules uplink data and transmits downlink data and then the base station performs corresponding feedback.

In a TDD system, because uplink transmission and downlink transmission occupy different subframes, an RTT is usually greater than 8 ms. For example, the RTT may be 13 ms or 16 ms in a TDD configuration. This 8 ms is a minimum delay required by an air interface required in an RTT for a single transmission. If a signaling interaction process in a service transmission process is considered, such as M times of interaction, a delay from service initiation to beginning of service transmission is at least 8M. If M=10, an 80 ms delay is required. This greatly affects user experience and performance of a wireless network.

SUMMARY

The embodiments provide a wireless communications method and system, a network device, and user equipment, so as to shorten transmission delay, improve user experience, and enhance performance of a wireless network.

According to a first aspect, a wireless communication method is provided, including: sending, by a network device, resource configuration information to user equipment, where the resource configuration information is used to indicate a first transmission resource corresponding to first transmission, and duration of a transmission resource occupied by one transmission of the first transmission is less than 1 millisecond; and communicating, by the network device, with the user equipment based on the first transmission resource.

According to a second aspect, a wireless communication method is provided, including: receiving, by user equipment, resource configuration information sent by a network device, where the resource configuration information is used to indicate a first transmission resource corresponding to first transmission, and duration of a transmission resource occupied by one transmission of the first transmission is less than 1 millisecond; and communicating, by the user equipment, with the network device based on the first transmission resource.

According to a third aspect, a wireless communication method is provided, including: sending, by a network device, configuration information to user equipment; and receiving, by the network device, a demodulation reference signal (DMRS) that is generated according to the configuration information and that is sent by the user equipment, where all time domain symbols included in a subframe in which a time domain symbol used by the user equipment to generate the DMRS is located are allocated to M user equipments, and M is an integer not less than 2.

According to a fourth aspect, a wireless communication method is provided, including: receiving, by user equipment, configuration information sent by a network device; generating, by the user equipment, a DMRS according to the configuration information, where all time domain symbols included in a subframe in which a time domain symbol used to generate the DMRS is located are allocated to M user equipments, and M is an integer not less than 2; and sending, by the user equipment, the DMRS to the network device.

According to a fifth aspect, a wireless communication method is provided, including: sending, by a network device, resource indication information to user equipment, where the resource indication information is used to indicate a resource occupied by an uplink control channel related to first transmission, and duration of occupying a resource by one transmission of the first transmission is less than 1 ms; and receiving, by the network device, uplink control information that is related to the first transmission and that is sent by the user equipment on the resource occupied by the uplink control channel.

According to a sixth aspect, a wireless communication method is provided, including: obtaining, by user equipment, a resource occupied by an uplink control channel related to first transmission, where duration of occupying a resource by one transmission of the first transmission is less than 1 ms; and sending, by the user equipment on the resource occupied by the uplink control channel related to the first transmission, uplink control information related to the first transmission to a network device.

According to a seventh aspect, a network device is provided, including: a transceiver module, configured to send resource configuration information to user equipment, where the resource configuration information is used to indicate a first transmission resource corresponding to first transmission, and duration of a transmission resource occupied by one transmission of the first transmission is less than 1 millisecond; and a processing module, configured to control the transceiver module to communicate with the user equipment based on the first transmission resource.

According to an eighth aspect, user equipment is provided, including: a transceiver module, configured to receive resource configuration information sent by a network device, where the resource configuration information is used to indicate a first transmission resource corresponding to first transmission, and duration of a transmission resource occupied by one transmission of the first transmission is less than 1 millisecond; and a processing module, configured to control the transceiver module to communicate with the network device based on the first transmission resource.

According to a ninth aspect, a network device is provided, including: a sending module, configured to send configuration information to user equipment; and a receiving module, configured to receive a DMRS that is generated according to the configuration information and that is sent by the user equipment, where all time domain symbols included in a subframe in which a time domain symbol used by the user equipment to generate the DMRS is located are allocated to M user equipments, and M is an integer not less than 2.

According to a tenth aspect, user equipment is provided, including: a transceiver module, configured to receive configuration information sent by a network device; and a signal generation module, configured to generate a DMRS according to the configuration information, where all time domain symbols included in a subframe in which a time domain symbol used to generate the DMRS is located are allocated to M user equipments, and M is an integer not less than 2. The transceiver module is further configured to send the DMRS to the network device.

According to an eleventh aspect, a network device is provided, including: a sending module, configured to send resource indication information to user equipment, where the resource indication information is used to indicate a resource occupied by an uplink control channel related to first transmission, and duration of occupying a resource by one transmission of the first transmission is less than 1 ms; and a receiving module, configured to receive uplink control information that is related to the first transmission and that is sent by the user equipment on the resource occupied by the uplink control channel.

According to a twelfth aspect, user equipment is provided, including: an obtaining module, configured to obtain a resource occupied by an uplink control channel related to first transmission, where duration of occupying a resource by one transmission of the first transmission is less than 1 ms; and a transceiver module, configured to send, on the resource occupied by the uplink control channel related to the first transmission, uplink control information related to the first transmission to a network device.

According to a thirteenth aspect, a wireless communications system is provided, including the network device in the seventh aspect and the user equipment in the eighth aspect.

According to a fourteenth aspect, a wireless communications system is provided, including the network device in the ninth aspect and the user equipment in the tenth aspect.

According to a fifteenth aspect, a wireless communications system is provided, including the network device in the eleventh aspect and the user equipment in the twelfth aspect.

Based on the foregoing features, according to the wireless communications method and system, the network device, and the user equipment provided in the embodiments, the network device sends the resource configuration information to the user equipment. The resource configuration information is used to indicate the first transmission resource corresponding to the first transmission, and the duration of a transmission resource occupied by one transmission of the first transmission is less than 1 millisecond. The network device communicates with the user equipment based on the first transmission resource. In this way, a transmission delay can be shortened, user experience can be greatly improved, and performance of a wireless network can be greatly enhanced.

BRIEF DESCRIPTION OF DRAWINGS

To describe the solutions in the embodiments more clearly, the following briefly describes the accompanying drawings required for describing the embodiments or the prior art. Apparently, the accompanying drawings in the following description show merely some embodiments, and a person of ordinary skill in the art may still derive other drawings from these accompanying drawings without creative efforts.

FIG. 8 is still another schematic flowchart of a wireless communication method according to an embodiment;

FIG. 9 is still another schematic flowchart of a wireless communication method according to an embodiment;

FIG. 10 is still another schematic flowchart of a wireless communication method according to an embodiment;

FIG. 11 is a schematic flowchart of a wireless communication method according to still another embodiment;

FIG. 17 is still another schematic flowchart of a wireless communication method according to still another embodiment;

FIG. 18 is a schematic flowchart of a wireless communication method according to still another embodiment;

FIG. 21 is another schematic flowchart of a wireless communication method according to still another embodiment;

FIG. 26 is a schematic flowchart of a wireless communication method according to still another embodiment;

FIG. 27 is another schematic flowchart of a wireless communication method according to still another embodiment;

DETAILED DESCRIPTION OF THE EMBODIMENTS

The following describes the solutions in the embodiments with reference to the accompanying drawings in the embodiments. Apparently, the described embodiments are some but not all of the embodiments. All other embodiments obtained by a person of ordinary skill in the art based on the embodiments without undue experiment shall fall within the protection scope.

It may be understood that, the solutions of the embodiments may be applied to various communications systems, such as a Global System for Mobile Communications (GSM) system, a Code Division Multiple Access (CDMA) system, a Wideband Code Division Multiple Access (WCDMA) system, a Long Term Evolution (LTE) system, an LTE frequency division duplex (FDD) system, LTE time division duplex (TDD) system, a Universal Mobile Telecommunications System (UMTS), and a future 5G communications system.

It may be understood that in the embodiments, user equipment may also be referred to as terminal device (Terminal Equipment), a mobile station (MS), a mobile terminal (Mobile Terminal), and the like. The user equipment may communicate with one or more core networks by using a radio access network (RAN). For example, the user equipment may be a mobile phone (or referred to as a "cellular" phone) or a computer with a mobile terminal. For example, the user equipment may be a portable, pocket-sized, handheld, computer built-in, or in-vehicle mobile apparatus, a terminal device in a future 5G network, or a terminal device in a future evolved PLMN network.

It may be further understood that in the embodiments, a network device may be a device for communicating with user equipment. The network device may be a base transceiver station (BTS) in a GSM system or a CDMA system, may be a NodeB (NB) in a WCDMA system, or may be an evolved NodeB (eNB or eNodeB) in an LTE system. Alternatively, the network device may be a relay station, an access point, an in-vehicle device, a wearable device, a network-side device in a future 5G network, a network device in a future evolved PLMN network, or the like.

Figure 1:
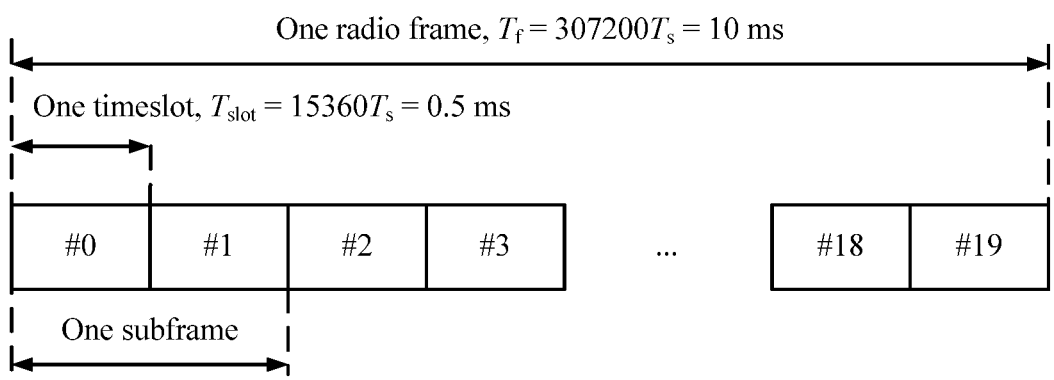
FIG. 1 is a schematic diagram of a frequency division duplex frame structure of a radio frame in the prior art.
Figure 2:
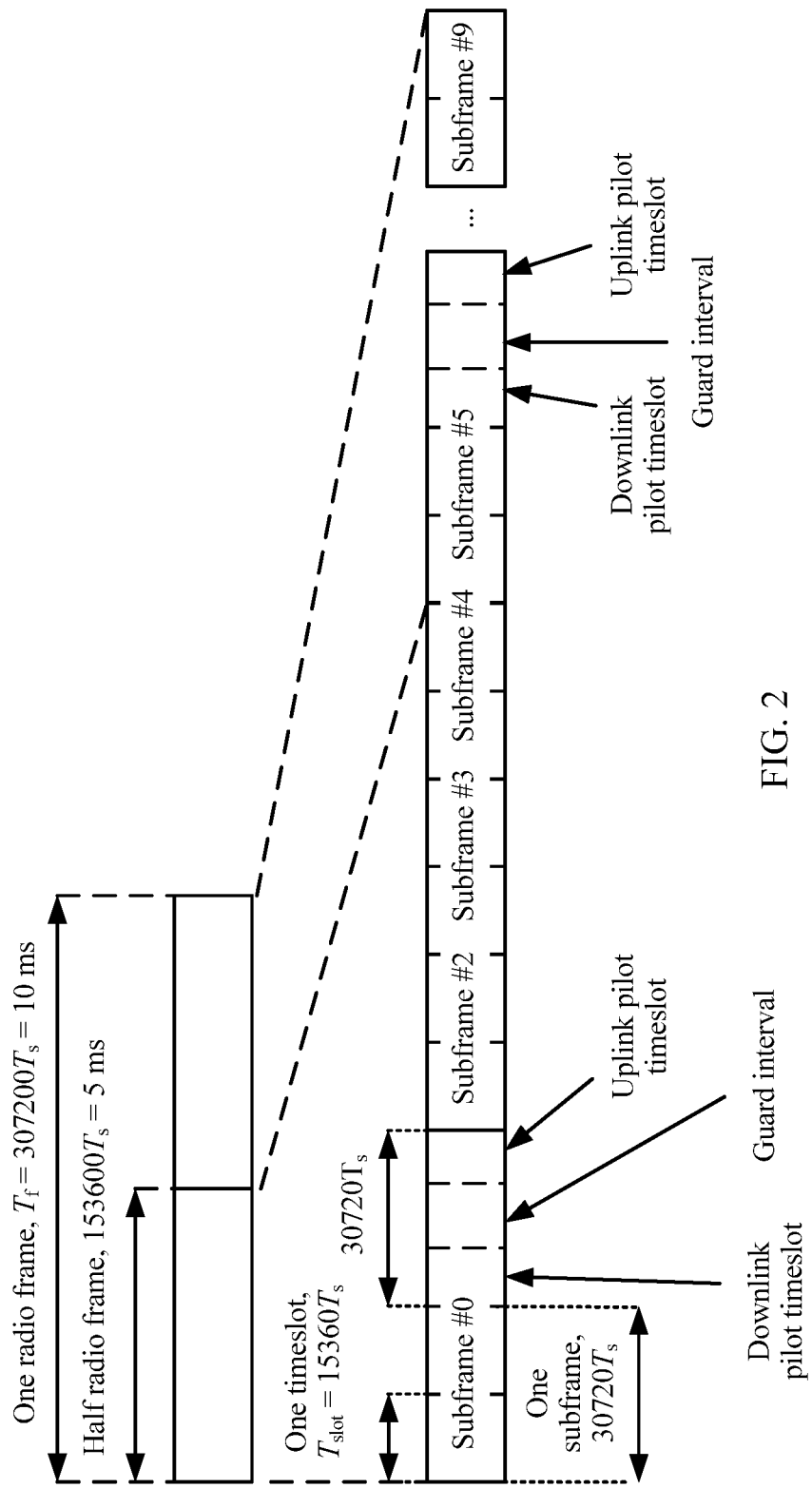
FIG. 2 is a schematic diagram of a time division duplex frame structure of a radio frame in the prior art.
Figures 3, 4:
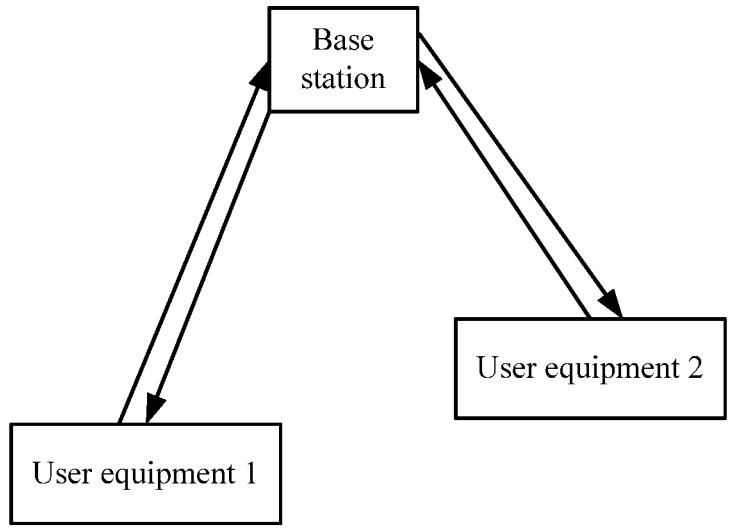
FIG. 3 is a schematic architecture diagram of a communications system to which an embodiment is applied.
FIG. 4 is a schematic flowchart of a wireless communication method according to an embodiment.

FIG. 3 is a schematic diagram of an application scenario of an embodiment. As shown in FIG. 1, multiple user equipments UEs are located in coverage of an eNodeB eNB. The eNodeB performs wireless communication with the multiple UEs. The eNB may flexibly schedule different transmission modes for UE 1 and UE 2 according to a service requirement, a resource status, and a scheduling status, so as to improve transmission performance and transmission efficiency.

It may be noted that, the scenario in FIG. 3 shows only a case in which there is one base station (an isolated base station). However, the embodiments are not limited. There may be a neighboring base station and user equipment that transmit a service on a same time-frequency resource as the base station.

It may be understood that, the time-frequency resource may be generally a communications resource. For example, the time-frequency resource may be a communications resource in a time dimension and a frequency dimension. A minimum unit of the time-frequency resource is not limited. For example, the time-frequency resource may be in a minimum unit of a subframe, a frame, or a timeslot in terms of time, and may be in a minimum unit of a subband, an entire operating band, or a subcarrier in terms of frequency. A time-frequency dimension may be a resource block, a resource element, or the like.

It may be understood that for ease of description, in an embodiment, in an existing LTE system, transmission in which duration of a transmission resource occupied by one transmission is 1 ms is referred to as non-shortened-delay transmission (corresponding to second transmission in this embodiment), and a 1 ms subframe is referred to as a non-shortened-delay subframe if all resources in the subframe are used for non-shortened-delay transmission. First transmission in this embodiment is relative to the non-shortened-delay transmission in the LTE system. Duration of a transmission resource occupied by one transmission of the first transmission is less than 1 millisecond in this embodiment. The first transmission in this embodiment may be referred to as shortened-delay transmission. One transmission (or referred to as "single transmission") means that a network device or user equipment performs one time of sending or receiving on a resource actually occupied by the first transmission in a 1 ms subframe. A 1 ms subframe may be referred to as a shortened-delay subframe if all resources in the entire subframe are used for shortened-delay transmission or if all resources of a physical downlink shared channel (PDSCH) in the entire subframe are used for shortened-delay transmission. However, the protection scope is not limited to this name.

The shortened-delay subframe in this embodiment may include two cases in actual use. Case 1: In a subframe, except a symbol of a control channel on which a physical downlink control channel (PDCCH) is located, all resources on another symbol in frequency domain are used for shortened-delay transmission. Case 2: In a subframe, except a symbol of a control channel on which a PDCCH is located, some sub-bands or bandwidth on another symbol in frequency domain are used for shortened-delay transmission. A subframe in Case 1 may be referred to as a subframe dedicated for a shorten delay, and a subframe in Case 2 may be referred to as a subframe in which some sub-bands are used for a shorten delay. During transmission in this embodiment, a type of the shortened-delay subframe may be any one of the foregoing subframes, or a combination of the two types of subframes (that is, in configured subframes, some subframes are dedicated for a shorten delay, and some subframes are subframes in which some sub-bands are used for a shorten delay).

FIG. 4 is a schematic flowchart of a wireless communication method according to an embodiment. The method may be performed by a network device. As shown in FIG. 4, a method 1000 includes the following steps.

S1100. The network device sends resource configuration information to user equipment, where the resource configuration information is used to indicate a first transmission resource corresponding to first transmission, and duration of a transmission resource occupied by one transmission of the first transmission is less than 1 millisecond.

S1200. The network device communicates with the user equipment based on the first transmission resource.

The network device sends, to the user equipment, the resource configuration information used to indicate the first transmission resource corresponding to the first transmission and communicates with the user equipment based on the first transmission resource. It may be understood that, the duration of a transmission resource occupied by one transmission of the first transmission is less than 1 millisecond.

Based on the above, according to the wireless communication method in this embodiment, the network device sends, to the user equipment, the resource configuration information that indicates the first transmission resource corresponding to the first transmission and communicates with the user equipment based on the first transmission resource. In this way, a communication delay between the network device and the user equipment can be shortened, user experience can be improved, and performance of a wireless network can be enhanced.

It may be understood that, in this embodiment, the network device communicates with the user equipment based on the first transmission resource may include the following cases: (1) The network device performs non-shortened-delay transmission with the user equipment. (2) The network device performs shortened-delay transmission (the first transmission) with the user equipment. In addition, transmission resources occupied when the network device performs shortened-delay transmission with the user equipment are some resources in the first transmission resource.

In this embodiment, the network device may explicitly or implicitly indicate, to the user equipment, configuration information of a shortened-delay subframe that is being used or to be used. For example, the network device may directly indicate a specific subframe configured as a shortened-delay subframe; or may provide, in a predefined manner, multiple methods for configuring a shortened-delay subframe, and indicate an actually used configuration method by using signaling; or may implicitly indicate, to the user equipment, configuration information of a shortened-delay subframe that is being used or to be used, this is non-limiting.

In S1100, the first transmission resource may correspond to the first transmission and that is indicated by the resource configuration information occupies, in time domain, one or more subframes in a multimedia broadcast multicast service single frequency network (MBSFN) subframe set. In a FDD mode, the MBSFN includes subframes 1, 2, 3, 6, 7, and 8. In a TDD mode, the MBSFN includes subframes 3, 4, 7, 8, and 9. Therefore, it may be ensured that user equipment without a need to perform shortened-delay transmission does not send data in a shortened-delay subframe.

Figure 5:
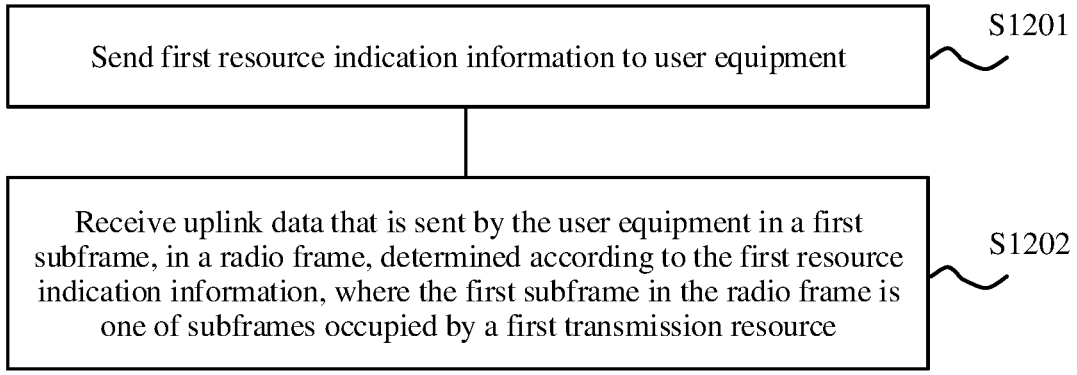
FIG. 5 is another schematic flowchart of a wireless communication method according to an embodiment.

As shown in FIG. 5, S1200 the following steps may be included:

S1201. Send first resource indication information to the user equipment.

S1202. Receive uplink data that is sent by the user equipment in a first subframe, in a radio frame, determined according to the first resource indication information, where the first subframe in the radio frame is one of subframes occupied by the first transmission resource.

In S1201, the first resource indication information indicates a resource that can be used by the user equipment to perform uplink transmission in a current communication process. The user equipment determines, according to the first resource indication information, a shortened-delay subframe used for uplink transmission from the subframes occupied by the first transmission resource, and sends the uplink data to the network device.

In S1202, the radio frame may further include a subframe used for second transmission, and duration of a transmission resource occupied by one transmission of the second transmission is 1 ms. In other words, a subframe used for shortened-delay transmission and a subframe used for non-shortened-delay transmission are in a same radio frame. The radio frame may be an FDD radio frame or a TDD radio frame. Therefore, efficiency of shortened-delay transmission can be effectively improved.

Figure 6:
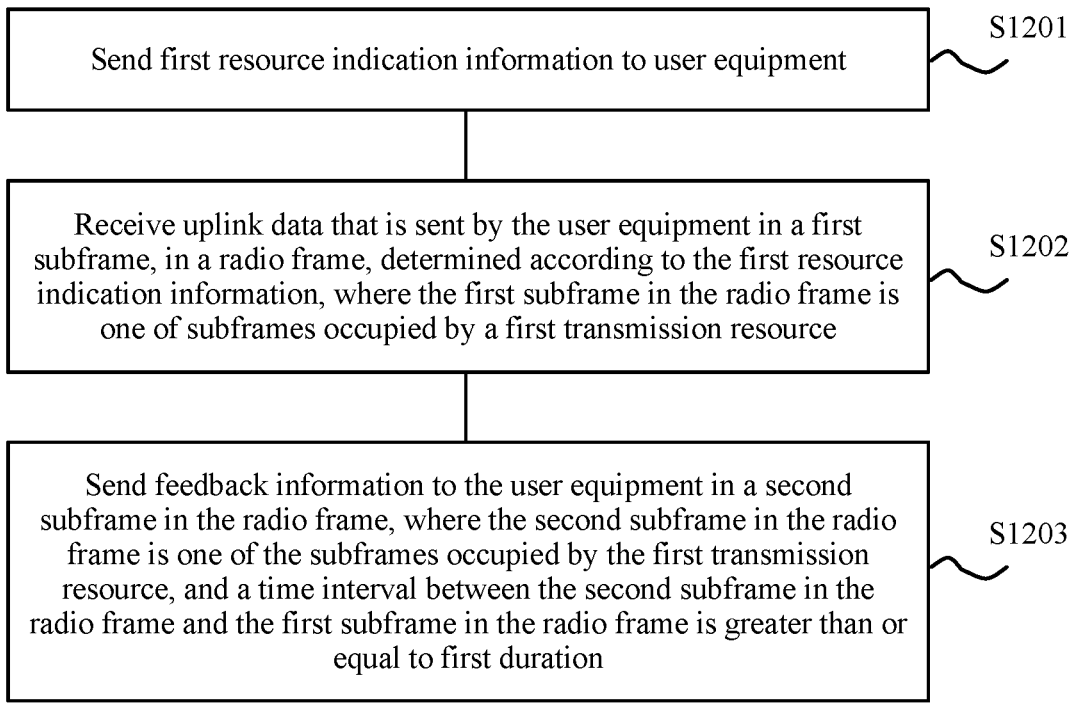
FIG. 6(a) is another schematic flowcharts of a wireless communication method according to an embodiment.
FIG. 6(b) is still another schematic flowcharts of a wireless communication method according to an embodiment.
Figure 6:
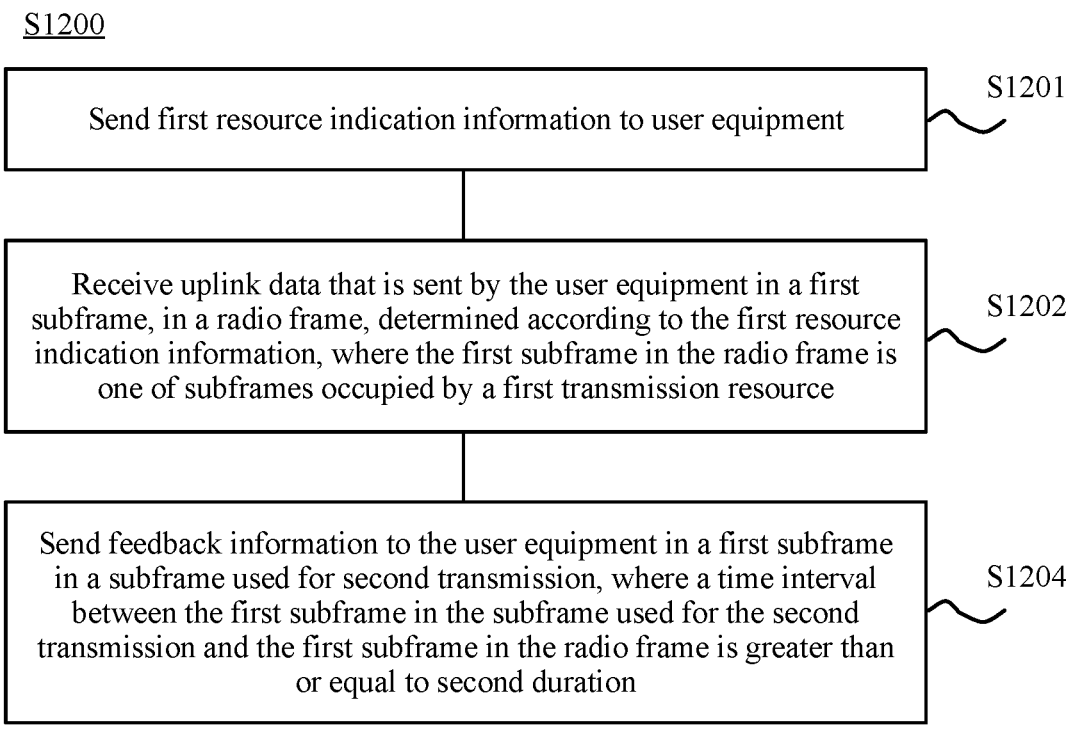

As shown in FIG. 6(*a*), S1200 may further include the following step:

S1203. Send feedback information to the user equipment in a second subframe in the radio frame, where the second subframe in the radio frame is one of the subframes occupied by the first transmission resource, and a time interval between the second subframe in the radio frame and the first subframe in the radio frame is greater than or equal to first duration.

As shown in FIG. 6(b), S1200 may further include the following step:

S1204. Send feedback information to the user equipment in a first subframe in a subframe used for second transmission, where a time interval between the first subframe in the subframe used for the second transmission and the first subframe in the radio frame is greater than or equal to second duration.

When receiving the uplink data transmitted by the user equipment in a shortened-delay subframe, the network device may send the feedback information to the user equipment in a shortened-delay subframe that meets a delay requirement. The first duration may be any value specified according to an actual requirement. For example, the first duration may be 0.5 ms, 1 ms, or 2 ms, or any other number, and is non-limiting.

When receiving the uplink data transmitted by the user equipment in a shortened-delay subframe, the network device may send the feedback information to the user equipment in the first subframe in the subframe that is used for the second transmission and that meets a delay requirement. The second duration may be any value specified according to an actual requirement. For example, the second duration may be 0.5 ms, 1 ms, or 2 ms, or any other number, and is non-limiting.

That is, when the network device receives the uplink data sent by the user equipment in a shortened-delay subframe, the network device may send the feedback information to the user equipment in a shortened-delay subframe that meets the delay requirement, or may send the feedback information to the user equipment in a non-shortened-delay subframe that meets the delay requirement, or may choose, by determining a delay length, whether to use a shortened-delay subframe or a non-shortened-delay subframe to send the feedback information to the user equipment. This is not limited.

The network device may send the feedback information to the user equipment in the second subframe in the radio frame when determining that a transmission delay for sending the feedback information in the second subframe in the radio frame is less than or equal to a transmission delay for sending the feedback information in the first subframe in the subframe used for the second transmission; or when determining that a transmission delay for sending the feedback information in the second subframe in the radio frame is greater than a transmission delay for sending the feedback information in the first subframe in the subframe used for the second transmission, the network device sends the feedback information to the user equipment in the first subframe in the subframe used for the second transmission.

In an embodiment, optionally, when sending, to the user equipment, feedback information indicating that the uplink data is unsuccessfully received, the network device may receive, at an interval of third duration from a moment at which the feedback information is sent, retransmission data sent by the user equipment. The third duration may be any value specified according to an actual requirement. For example, in an existing LTE protocol, the third duration is 4 ms in FDD, and is not less than 4 ms in TDD, this is non-limiting.

Based on the above, according to the wireless communication method in this embodiment, when the network device sends, to the user equipment, the feedback information that is specific to the uplink data and that indicates that the data sent by the user equipment is unsuccessfully received, the user equipment may select a subframe that meets a transmission delay requirement, to transmit the retransmission data. In this way, a delay in a communication process can be shortened, and user experience can be improved.

In this embodiment, optionally, when the network device sends, to the user equipment, feedback information indicating that the uplink data is unsuccessfully received, the network device may receive, in a third subframe in the radio frame, retransmission data sent by the user equipment. The third subframe in the radio frame is one of the subframes occupied by the first transmission resource. A time interval between the third subframe in the radio frame and a subframe used by the network device to send the feedback information is greater than or equal to fourth duration. The fourth duration may be any value specified according to an actual requirement. For example, the fourth duration may be 1 ms or 2 ms. The network device may send the feedback information to the user equipment in a subframe used for shortened-delay transmission, where the subframe is at a minimum time interval with the subframe used by the network device to send the feedback information, and the time interval is greater than or equal to the fourth duration.

It may be understood that, in this embodiment, the feedback information is information used by the network device to indicate whether the network device successfully receives the data sent by the user equipment. For example, when the network device successfully receives the data sent by the user equipment, the feedback information may be ACK information in an existing LTE system. When the network device unsuccessfully receives the data sent by the user equipment, the feedback information may be NACK information in the existing LTE system.

A wireless communication method in the embodiments is described below with reference to the embodiments. It may be understood that these examples are merely intended to help a person of ordinary skill in the art better understand the embodiments, but are non-limiting.

Figure 7A:
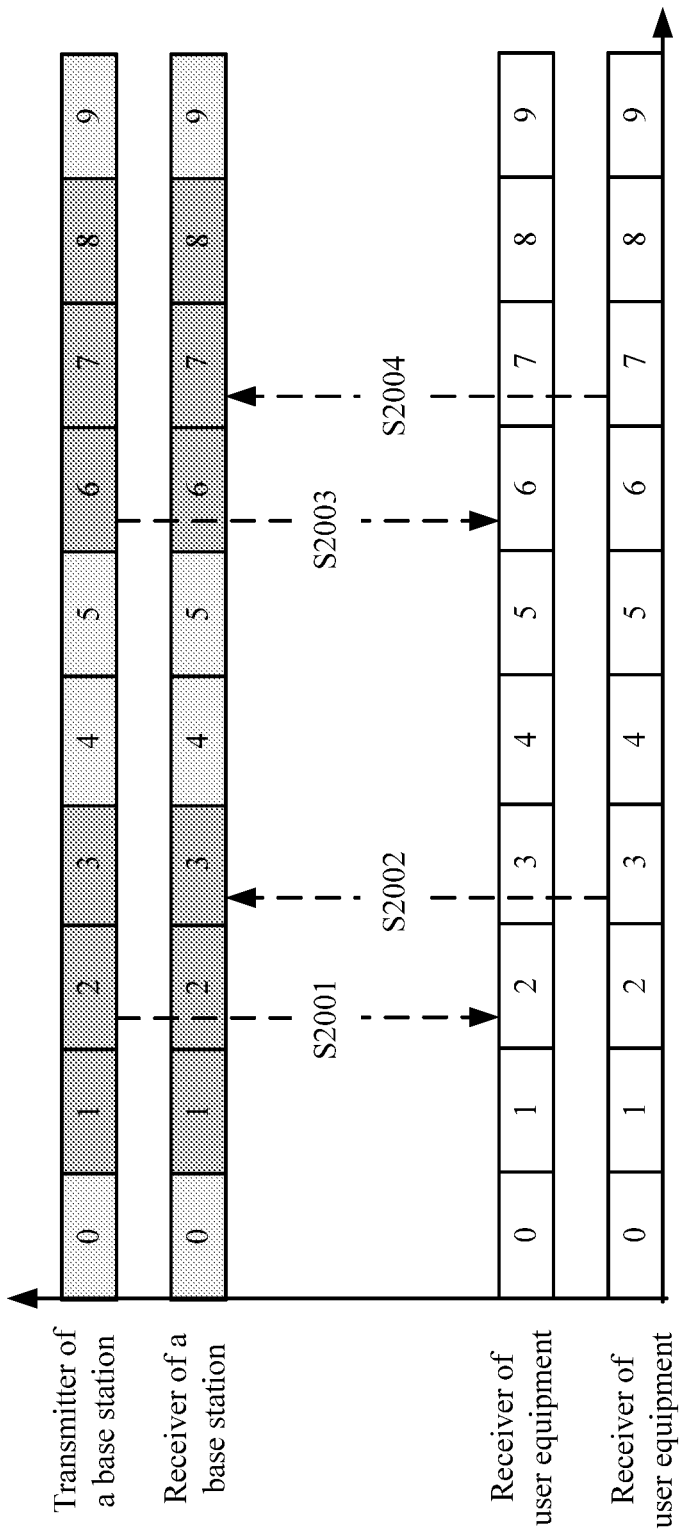
FIG. 7(a) is a schematic flowchart of a wireless communication method according to another embodiment.

FIG. 7(a) shows a wireless communication method according to another embodiment. As shown in FIG. 7(a), a dark-colored subframe represents a subframe configured as a shortened-delay subframe, and a light-colored subframe is a non-shortened-delay subframe in LTE. A method 2000 may include the following steps:

S2001. A base station sends downlink control information (DCI) to user equipment in a shortened-delay subframe 2.

S2002. The base station receives, in a shortened-delay subframe 3, uplink data sent by the user equipment.

S2003. The base station sends, in a shortened-delay subframe 6, feedback information specific to the uplink data to the user equipment.

S2004. The base station receives, in a shortened-delay subframe 7, retransmission data sent by the user equipment.

Based on the above, according to the wireless communication method in this embodiment, shortened-delay transmission (uplink transmission and downlink transmission) is performed only in a shortened-delay subframe configured by the base station. In this way, a shortened-delay subframe and a non-shortened-delay subframe are distinguished, and the user equipment can select an appropriate transmission resource without performing complex determining when the user equipment performs shortened-delay transmission, thereby improving user experience.

In shortened-delay transmission, a minimum time interval between information receiving and information sending may be set to 1 ms. As shown in FIG. 7(b), under a time constraint, S2003 may be: the base station sends feedback information to the user equipment in a non-shortened-delay subframe 4.

Correspondingly, S2004 may be: the base station receives, in a shortened-delay subframe 8, retransmission data sent by the user equipment.

Figure 7:
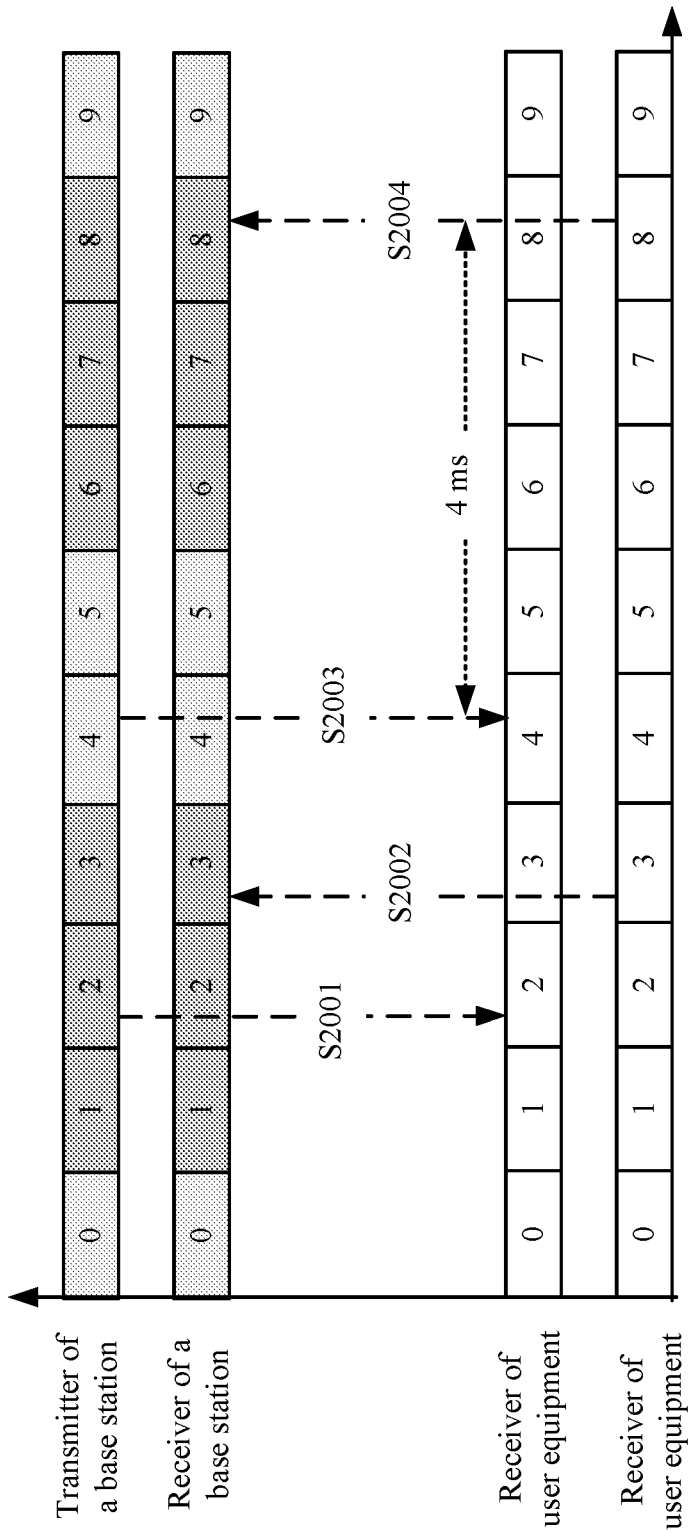
FIG. 7(b) is another schematic flowchart of a wireless communication method according to another embodiment.
FIG. 7(c) is another schematic flowchart of a wireless communication method according to another embodiment.
Figure 7:
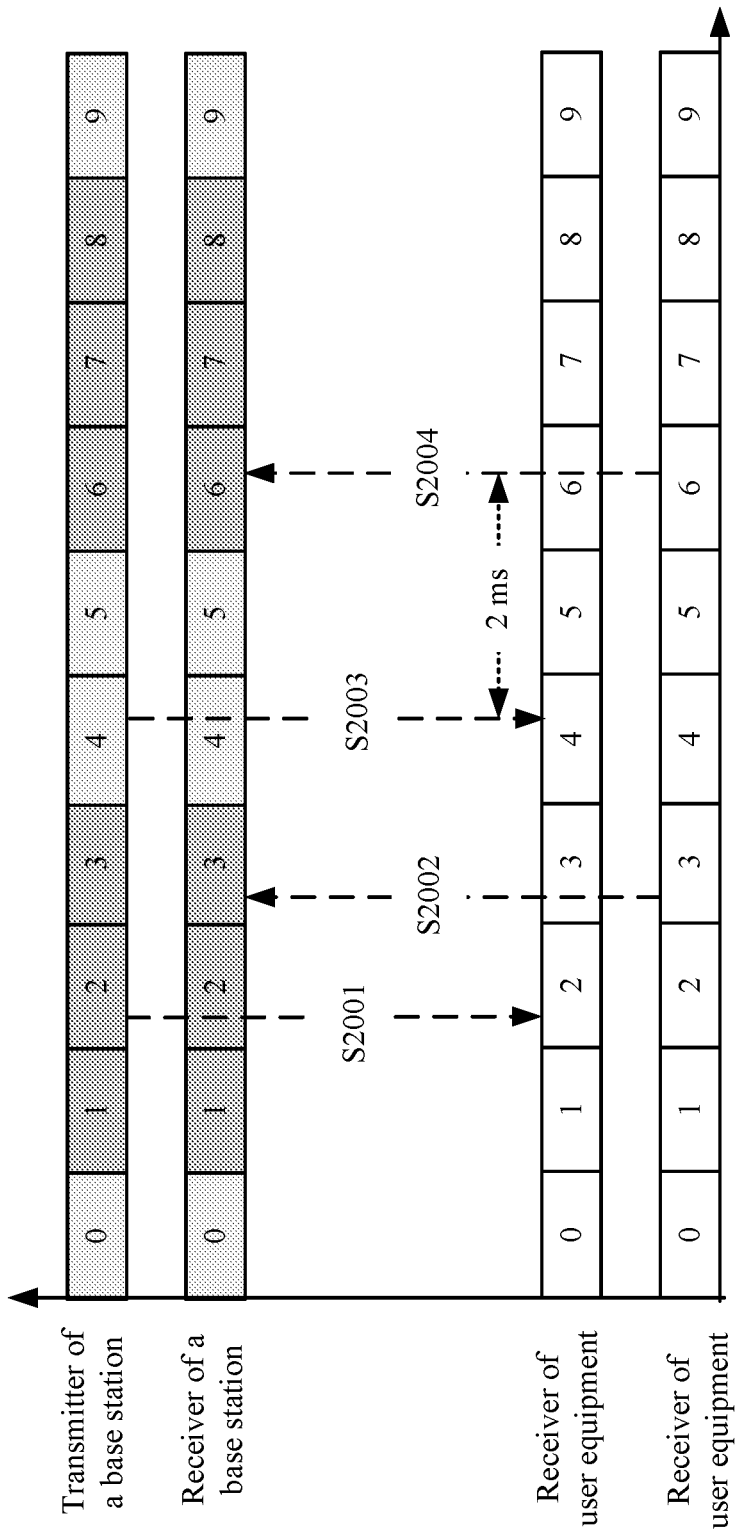

Alternatively, as shown in FIG. 7(*c*), S2004 may be: the base station receives, in a shortened-delay subframe 6, retransmission data sent by the user equipment.

The base station may further select, according to transmission delays corresponding to different transmission modes, a subframe for sending the feedback information. For example, if the feedback information is sent to the user equipment in a manner shown in FIG. 7(*a*), a transmission delay in an entire transmission process is 5 ms; if the feedback information is sent to the user equipment in a manner shown in FIG. 7(*b*), a transmission delay in an entire transmission process is 6 ms. In this case, the base station may choose to send the feedback information to the user equipment in the manner shown in FIG. 7(*a*).

In summary, as shown in FIG. 7(*b*), if the user equipment sends uplink service channel data in a shortened-delay subframe n, the base station may send, in a non-shortened-delay subframe n+1 neighboring to the shortened-delay subframe n, feedback information or scheduling information for retransmission, which is corresponding to the uplink service channel data. Then, the user equipment sends an uplink service channel retransmission packet in a subframe n+1+k0, and the subframe is not limited to a shortened-delay subframe. Duration corresponding to k0 is 4 ms in FDD, and is not less than 4 ms in TDD. That is, at a subframe boundary, if feedback from the base station is sent in a non-shortened-delay subframe, the user equipment may send uplink data in a subframe following the non-shortened-delay subframe.

Alternatively, as shown in FIG. 7(*c*), if the user equipment sends uplink service channel data in a shortened-delay subframe n, the base station may send, in a non-shortened-delay subframe n+1 neighboring to the shortened-delay subframe n, feedback information or scheduling information for retransmission, which corresponds to the uplink service channel data. The user equipment selects a shortened-delay subframe from a set of shortened-delay subframes to send uplink data, and an interval between the subframe n+1 and each of the shortened-delay subframes is not less than k1. A value of k1 may be set according to an actual requirement or a processing capability of a receiver. For example, k1 may be set to 1 ms or 2 ms. That is, at a subframe boundary, if feedback from the base station is sent in a non-shortened-delay subframe, the user equipment sends uplink data in a shortened-delay subframe, and a time interval between the shortened-delay subframe and the non-shortened-delay subframe meets a processing time requirement.

If the base station sends a feedback and retransmitted configuration information in a non-shortened-delay subframe, the user equipment may compare delays corresponding to different transmission methods, and select a method with a minimum delay to send uplink data. Alternatively, the base station may directly indicate, by using signaling, a specific manner or subframe used by the user equipment to transmit uplink data.

Based on the above, according to the wireless communication method in this embodiment, the network device may send, to the user equipment, the resource configuration information that indicates the first transmission resource corresponding to the first transmission, and communicates with the user equipment based on the first transmission resource. In this way, a communication delay between the network device and the user equipment can be shortened, user experience can be improved, and performance of a wireless network can be enhanced.

As shown in FIG. 8, S1200 may include the following steps:

S1205. Send second resource indication information to the user equipment to enable the user equipment to receive downlink data in a first subframe that is determined according to the second resource indication information, where the first subframe is one of subframes occupied by the first transmission resource.

S1206. Send the downlink data to the user equipment in the first subframe.

When the network device needs to send the downlink data to the user equipment, the network device may send the second resource indication information to the user equipment. The user equipment may determine, according to the second resource indication information, a shortened-delay subframe used by the network device to send the downlink data, and receive, in the shortened-delay subframe, the downlink data sent by the network device.

It may be understood that, in a downlink transmission process, the network device needs to indicate, to the user equipment in a non-shortened-delay subframe, a retransmission redundancy version (RV) and a process number of a non-shorten delay hybrid automatic repeat request (HARM) that are corresponding to the non-shortened-delay subframe, so that the user equipment identifies, from two different types of subframes, different retransmission packets of a same data packet, so as to receive and combine the retransmission packets.

As shown in FIG. 9, S1200 may include the following steps:

S1207. Send configuration information to the user equipment.

S1208. Receive a DMRS that is sent by the user equipment on a transmission resource in the first transmission resource according to the configuration information.

In S1207, the configuration information may include at least one of the following information: indication information used to indicate a location of a time domain symbol used by the user equipment to generate the DMRS, indication information used to indicate a frequency domain location at which the user equipment generates the DMRS, or indication information used to indicate transmit power for sending the DMRS by the user equipment.

In this embodiment, optionally, different user equipments may use DMRSs on different time domain symbols in a time division multiplexing manner, so that the network device can receive a DMRS signal.

In this embodiment, optionally, user equipment that is neighboring in terms of time domain may share a same time-frequency resource to use a DMRS. In this case, to distinguish between DMRSs of different user equipment, the network device needs to send signaling to the user equipment, so as to indicate transmit power for sending a DMRS by the user equipment.

In this embodiment, optionally, user equipment that is neighboring in terms of time domain resource may use a same time domain symbol to generate a DMRS, and DMRSs of different user equipment on the same time domain symbol are mapped onto different subcarriers in frequency domain.

As shown in FIG. 10, S1200 may include the following steps:

S1209. Send uplink control channel resource indication information to the user equipment, where the uplink control channel resource indication information indicates a time domain symbol location and a frequency domain location in a first subframe, the time symbol domain location and the frequency domain being both for an uplink control channel related to the first transmission, and the first subframe is one of subframes occupied by the first transmission resource.

S1210. Receive, in the first subframe, uplink control information that is related to the first transmission and that is sent by the user equipment according to the uplink control channel resource indication information.

In S1209, the uplink control channel resource indication information indicates that in a 1 ms subframe, an uplink control channel related to shortened-delay transmission occupies two separate sub-bands obtained by dividing a part except non-shorten delay PUCCH bandwidth, and uplink control channels of different user equipments occupy some subcarriers of some symbols. In addition, resources for the uplink control channels of the different user equipment are placed in REs on the two sub-bands in a same or symmetrical order.

Further, an uplink control channel (for example, a PUCCH) in a shortened-delay subframe occupies a resource on a subband by means of occupation first in frequency domain and then in time domain.

Further, resources of uplink control channels (for example, PUCCHs) of all user equipment may occupy a same symbol on two sub-bands.

Based on the above, according to the wireless communication method in this embodiment, both an uplink control channel related to shortened-delay transmission and an uplink control channel related to non-shortened-delay transmission can exist in a same radio frame, and the uplink control channel related to shortened-delay transmission occupies a resource on a subband by means of occupation first in frequency domain and then in time domain, so that time domain resources occupied by an uplink control channel can be reduced.

With reference to FIG. 4 to FIG. 10, a wireless communication method in an embodiment is described in detail on a network device side above, and with reference to FIG. 11 to FIG. 17, a wireless communication method in still another embodiment is described in detail on a user equipment side below. It may be understood that, interaction between user equipment and a network device, related features, related functions, and the like that are described on the network device side are corresponding to those described on the user equipment side. For brevity, repeated description is appropriately omitted.

FIG. 11 is a schematic flowchart of a wireless communication method according to still another embodiment. The method may be performed by user equipment. As shown in FIG. 11, a method 3000 may include the following steps:

S3100. The user equipment receives resource configuration information sent by a network device, where the resource configuration information is used to indicate a first transmission resource corresponding to first transmission, and duration of a transmission resource occupied by one transmission of the first transmission is less than 1 millisecond.

S3200. The user equipment communicates with the network device based on the first transmission resource.

The user equipment receives the resource configuration information that is sent by the network device and that is used to indicate the first transmission resource corresponding to the first transmission and communicates with the network device based on the first transmission resource. It may be understood that the duration of a transmission resource occupied by one transmission of the first transmission is less than 1 millisecond.

Based on the above, according to the wireless communication method in this embodiment, the user equipment may receive the resource configuration information that is sent by the network device and that is used to indicate the first transmission resource corresponding to the first transmission, and communicates with the network device based on the first transmission resource. In this way, a communication delay between the network device and the user equipment can be shortened, user experience can be improved, and performance of a wireless network can be enhanced.

In S3100, the first transmission resource may occupy, in time domain, one or more subframes in a MBSFN subframe set.

Figure 12:
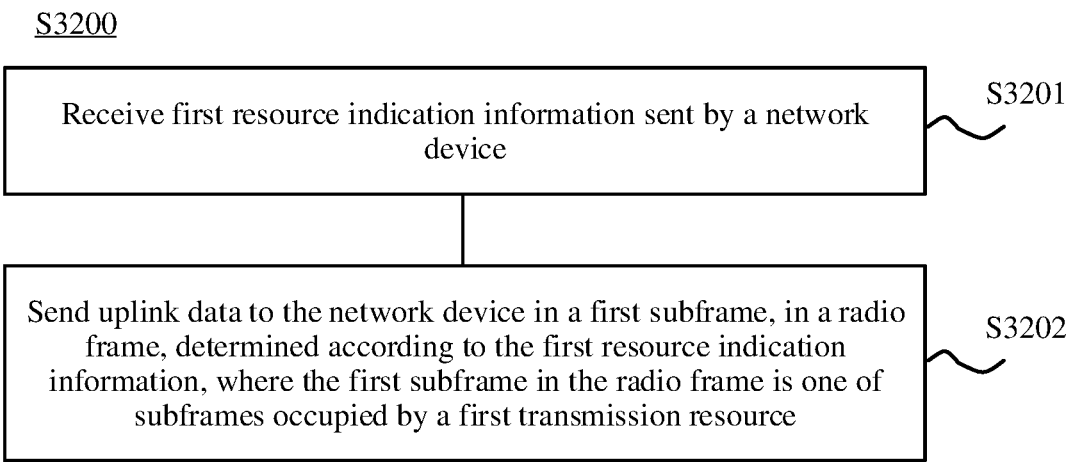
FIG. 12 is another schematic flowchart of a wireless communication method according to still another embodiment.
Figure 13:
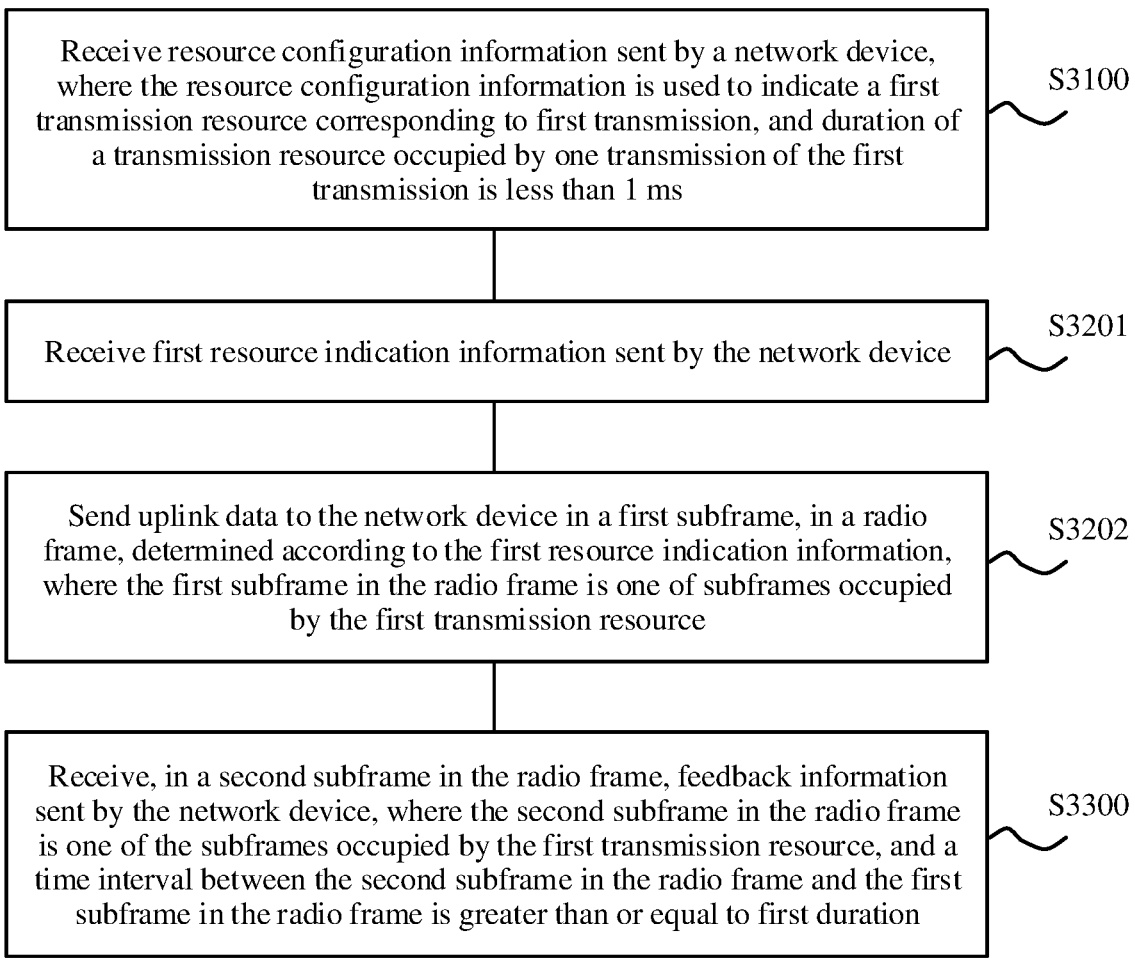
FIG. 13(a) is still another schematic flowchart of a wireless communication method according to still another embodiment.
FIG. 13(b) is still another schematic flowchart of a wireless communication method according to still another embodiment
Figure 13:
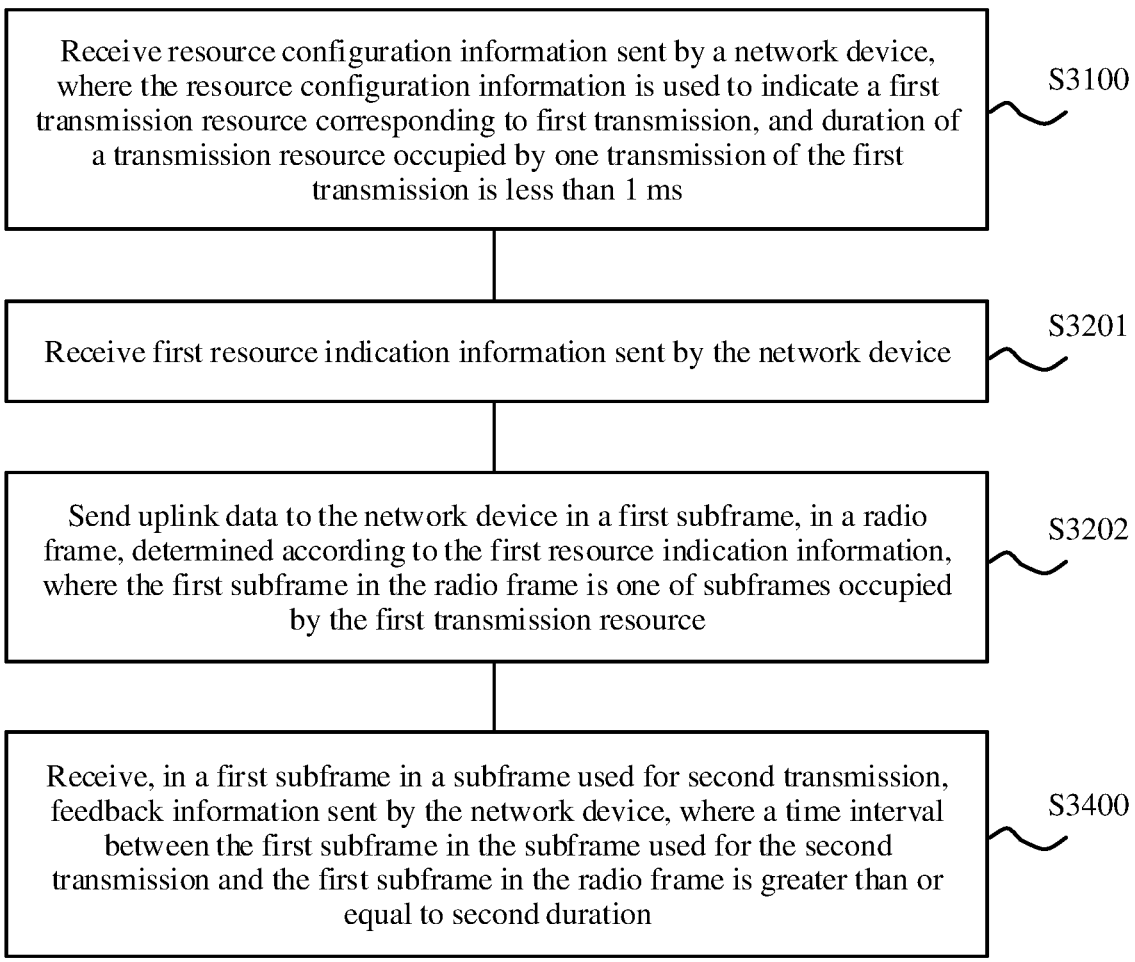
Figure 14:
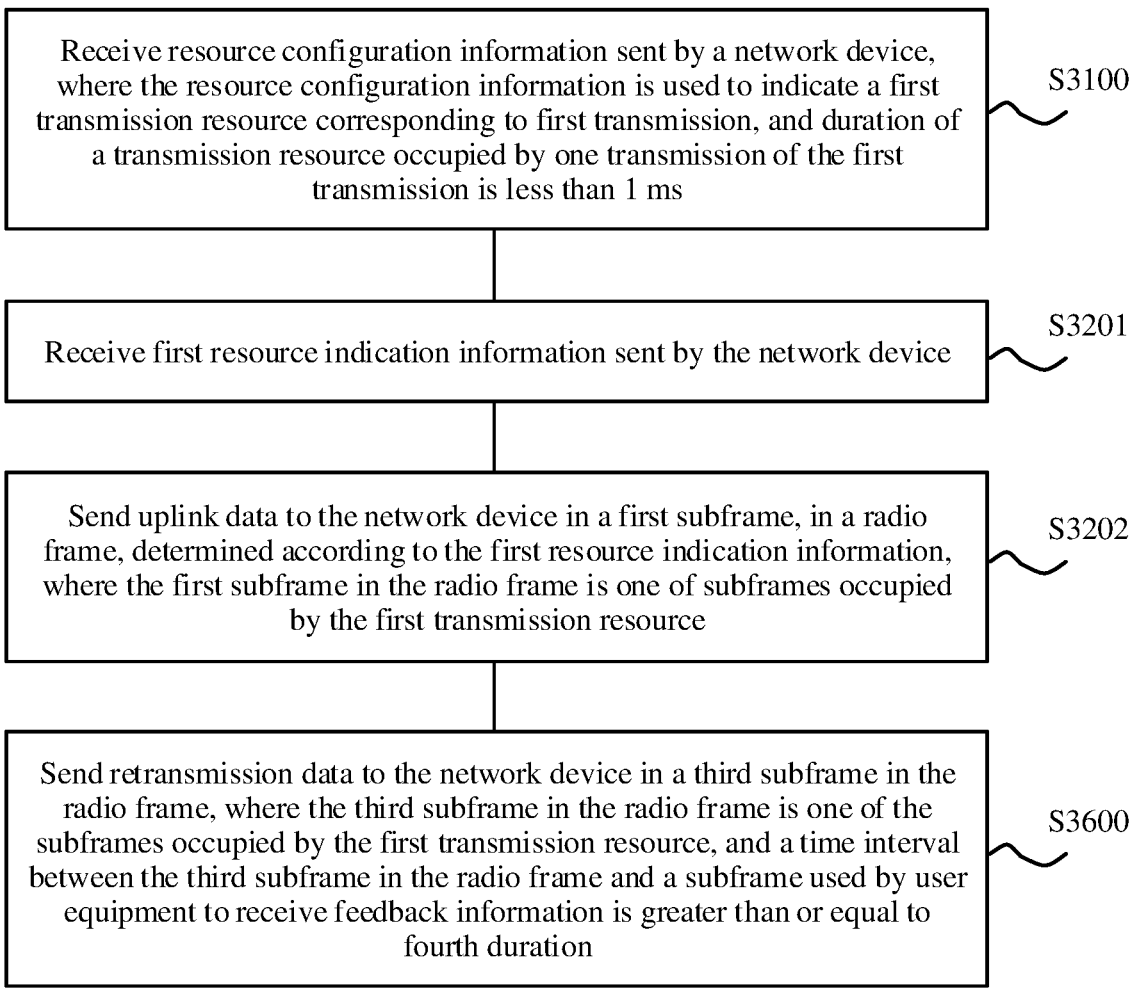
FIG. 14(a) is still another schematic flowchart of a wireless communication method according to still another embodiment.
FIG. 14(b) is still another schematic flowchart of a wireless communication method according to still another embodiment.

As shown in FIG. 12, S3200 may include the following steps:

S3201. Receive first resource indication information sent by the network device.

S3202. Send uplink data to the network device in a first subframe, in a radio frame, determined according to the first resource indication information, where the first subframe in the radio frame is one of subframes occupied by the first transmission resource.

In S3202, the radio frame may further include a subframe used for second transmission. Duration of a transmission resource occupied by one transmission of the second transmission is 1 ms.

As shown in FIG. 13(a), the method 3000 may further include the following step:

S3300. Receive, in a second subframe in the radio frame, feedback information sent by the network device, where the second subframe in the radio frame is one of the subframes occupied by the first transmission resource, and a time interval between the second subframe in the radio frame and the first subframe in the radio frame is greater than or equal to first duration.

As shown in FIG. 13(b), the method 3000 may further include the following step:

S3400. Receive, in a first subframe in a subframe used for second transmission, feedback information sent by the network device, where a time interval between the first subframe in the subframe used for the second transmission and the first subframe in the radio frame is greater than or equal to second duration.

As shown in FIG. 14(a), when the user equipment receives feedback information that is sent by the network device and that indicates that the network device unsuccessfully receives the uplink data, the method 3000 may further include the following step:

S3500. Send retransmission data to the network device at an interval of third duration from a moment at which the feedback information is received.

As shown in FIG. 14(b), the method 3000 may further include the following step:

S3600. Send retransmission data to the network device in a third subframe in the radio frame, where the third subframe in the radio frame is one of the subframes occupied by the first transmission resource, and a time interval between the third subframe in the radio frame and a subframe used by the user equipment to receive the feedback information is greater than or equal to fourth duration.

S3500 may include: when the third duration is less than the time interval between the third subframe in the radio frame and the subframe used by the user equipment to receive the feedback information, sending the retransmission data to the network device at the interval of the third duration from the moment at which the feedback information is received.

S3600 may include: sending the retransmission data to the network device in the third subframe in the radio frame when the third duration is greater than or equal to the time interval between the third subframe in the radio frame and the subframe used by the user equipment to receive the feedback information.

Figure 15:
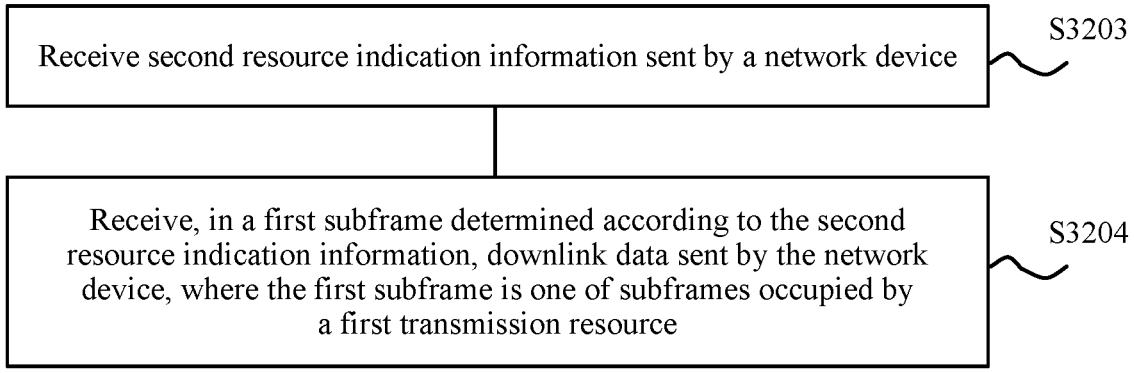
FIG. 15 is still another schematic flowchart of a wireless communication method according to still another embodiment.

As shown in FIG. 15, S3200 may include the following steps:

S3203. Receive second resource indication information sent by the network device.

S3204. Receive, in a first subframe that is determined according to the second resource indication information, downlink data sent by the network device, where the first subframe is one of subframes occupied by the first transmission resource.

Figure 16:
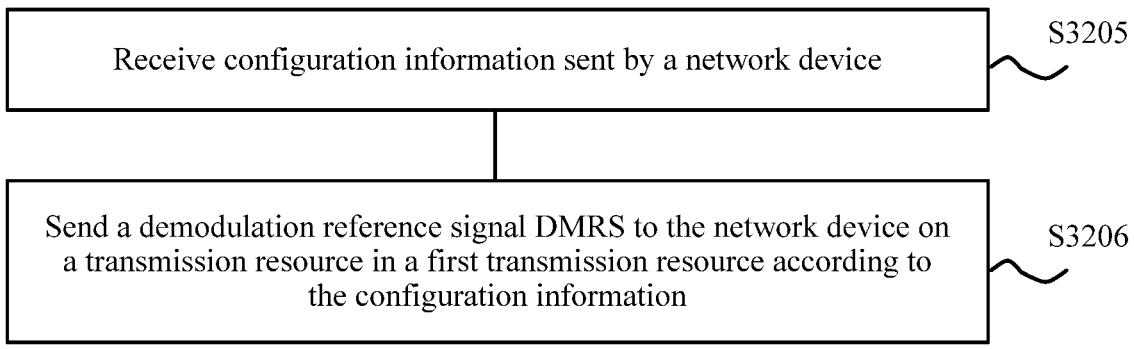
FIG. 16 is still another schematic flowchart of a wireless communication method according to still another embodiment.

As shown in FIG. 16, S3200 may include the following steps:

S3205. Receive configuration information sent by the network device.

S3206. Send a DMRS to the network device on a transmission resource in the first transmission resource according to the configuration information.

In S3205, the configuration information may include at least one of the following information: indication information used to indicate a location of a time domain symbol used by the user equipment to generate the DMRS, indication information used to indicate a frequency domain location at which the user equipment generates the DMRS, or indication information used to indicate transmit power for sending the DMRS by the user equipment.

As shown in FIG. 17, S3200 may include the following steps:

S3207. Receive uplink control channel resource indication information sent by the network device, where the uplink control channel resource indication information indicates a time domain symbol location and a frequency domain location in a first subframe, the time symbol domain location and the frequency domain being both for an uplink control channel related to the first transmission, and the first subframe is one of subframes occupied by the first transmission resource.

S3208. Send, in the first subframe according to the uplink control channel resource indication information, uplink control information related to the first transmission to the network device.

Based on the above, according to the wireless communication method in this embodiment, the user equipment may receive the resource configuration information that is sent by the network device and that is used to indicate the first transmission resource corresponding to the first transmission, and communicates with the network device based on the first transmission resource. In this way, a communication delay between the network device and the user equipment can be shortened, user experience can be improved, and performance of a wireless network can be enhanced.

With reference to FIG. 18, a wireless communication method in still another embodiment is described in detail below. The method may be performed by a network device. As shown in FIG. 18, a method 4000 may include the following steps:

S4100. The network device sends configuration information to user equipment.

S4200. The network device receives a DMRS that is generated according to the configuration information and that is sent by the user equipment, where all time domain symbols included in a subframe in which a time domain symbol used by the user equipment to generate the DMRS is located are allocated to M user equipment, and M is an integer not less than 2.

After sending, to the user equipment, the configuration information used by the user equipment to generate the DMRS, the network device may receive the DMRS that is generated by the user equipment according to the configuration information, and all the time domain symbols included in the subframe in which the time domain symbol used by the user equipment to generate the DMRS is located are allocated to at least two user equipment.

Based on the above, according to the wireless communication method in this embodiment, all the time domain symbols included in the subframe in which the time domain symbol is located are allocated to at least two user equipment, where the time domain symbol is used by the user equipment to generate the DMRS according to the configuration information sent by the network device. Therefore, an unnecessary delay in shortened-delay transmission can be avoided, and interference between DMRSs of different user equipment can be reduced.

It may be understood that, in this embodiment, all time domain symbols in a subframe are allocated to at least two user equipment. That is, each user equipment performs shortened-delay transmission in the subframe.

In this embodiment, the DMRS may be mapped, at intervals of N subcarriers, onto a subcarrier on a frequency domain resource corresponding to the time domain symbol used by the user equipment to generate the DMRS, where N is a positive integer. That is, the DMRS does not need to consecutively occupy all frequency domain subcarriers of bandwidth in which a PUCCH is located.

N may be a total quantity of time domain symbols occupied by all DMRSs in the subframe in which the time domain symbol used by the user equipment to generate the DMRS is located.

In this embodiment, at least two of the M user equipment may use different time domain symbols to generate a DMRS. However, locations of subcarriers in frequency domain that are occupied by all of the M user equipment may be the same or may be different.

Figure 19:
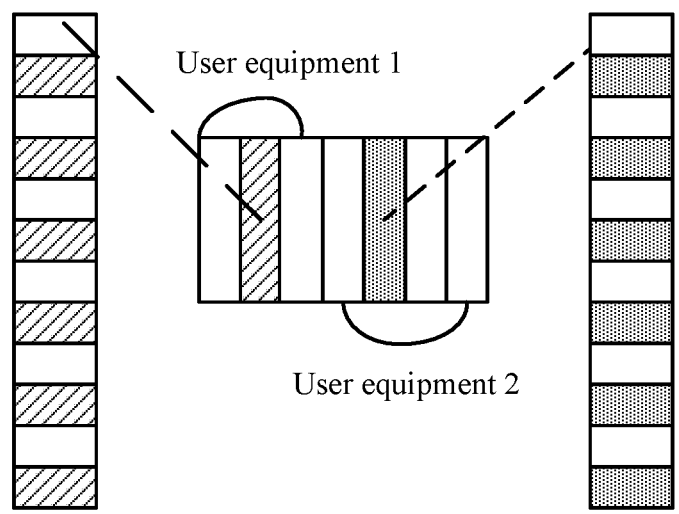
FIG. 19(a) is a schematic diagram of a location of a DMRS on a time-frequency resource according to an embodiment.
FIG. 19(b) is another schematic diagram of a location of a DMRS on a time-frequency resource according to an embodiment.
FIG. 19(c) is another schematic diagram of a location of a DMRS on a time-frequency resource according to an embodiment.
Figure 19:
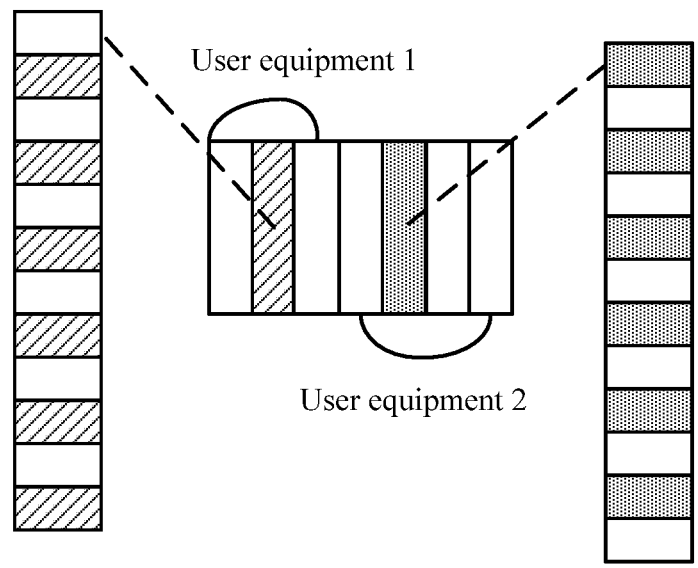
Figure 19:
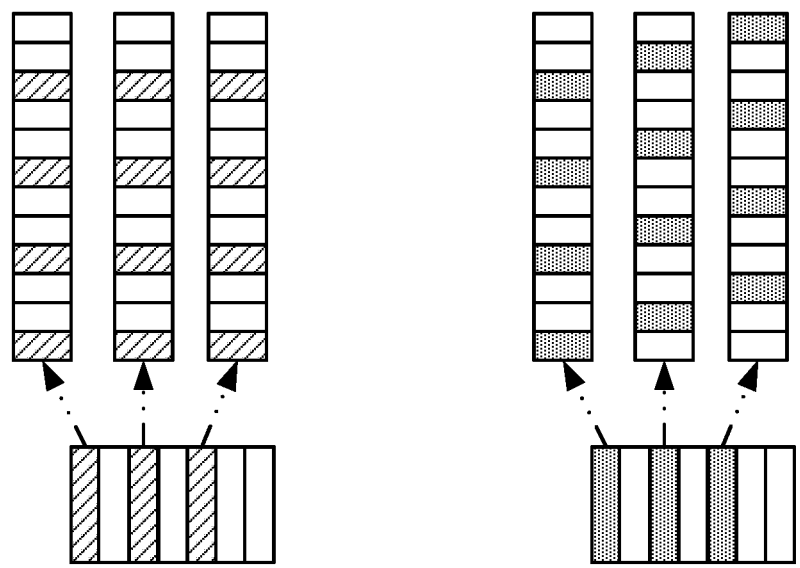

For example, as shown in FIG. 19(a), a 0.5 ms timeslot includes seven uplink symbols. It may be assumed that the symbols are sequentially numbered 0 to 6 from left to right. The symbols support two user equipment n performing uplink shorten delay sending, and there are two DMRS symbols. A time domain resource on which each user equipment is located may include one DMRS symbol. user equipment 1 occupies symbols 0, 1, and 2, and user equipment 2 occupies symbols 3, 4, 5, and 6. A DMRS of the user equipment 1 is in the symbol 1, and a DMRS symbol of the user equipment 2 is in the symbol 4. To reduce DMRS overheads in a shorten delay transmission, a DMRS used by the user equipment 1 and the user equipment 2 occupies one subcarrier at intervals of two subcarriers. In this way, the DMRS overheads are the same as DMRS overheads in a non-shorten delay transmission. Further, a quantity of resource elements of a DMRS included in each physical resource block (PRB) is reduced by half. Therefore, in order not to affect performance of a DMRS sequence in frequency domain, resources allocated for a shorten delay transmission are at least two PRBs.

Further, as shown in FIG. 19(b), locations of the two user equipment may be staggered in frequency domain. A location of the DMRS of the user equipment 1 in the frequency domain is different from a location of the DMRS of the user equipment 2 in the frequency domain.

Still further, as shown in FIG. 19(c), a 0.5 ms timeslot may include three DMRSs, and locations of the three DMRSs in frequency domain may be the same or different. The three DMRSs may be allocated to no more than three user equipment (including various cases such as one user equipment, two user equipment, and three user equipment) to perform shortened-delay transmission. In addition, in time domain symbol on which each DMRS is located, there is one DMRS at intervals of three subcarriers. Bandwidth allocated in the frequency domain may be a multiple of three PRBs.

Based on the above, according to the wireless communication method in this embodiment, different user equipment use DMRSs on different symbols in a time division multiplexing (TDM) manner. In this way, additional overheads can be avoided in a shortened-delay transmission process, and DMRSs are used and distinguished in uplink sending, so as to facilitate sending and receiving that is performed by the network device.

In this embodiment, optionally, the M user equipment may include at least two user equipment that are neighboring in terms of time domain resource, and all of the at least two user equipment that are neighboring in terms of time domain resource use a same time domain symbol to generate a DMRS. In addition, DMRSs generated by all the user equipment may be mapped onto a same subcarrier or different subcarriers in frequency domain.

Figure 20:
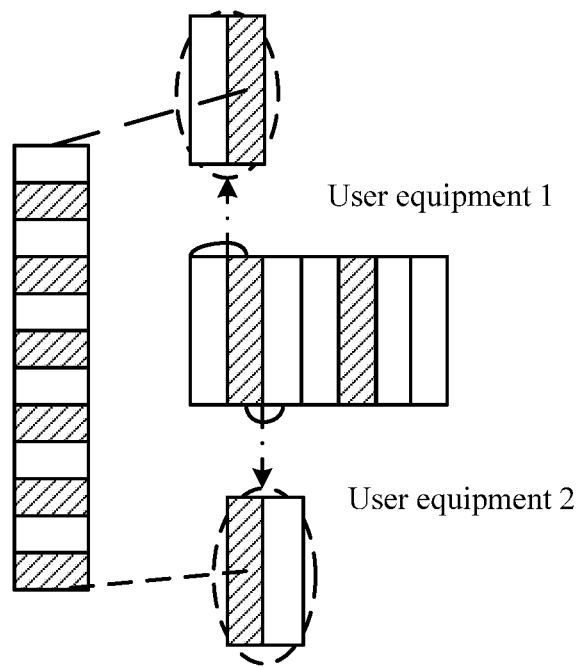
FIG. 20(a) is a schematic diagram of a location of a DMRS on a time-frequency resource according to another embodiment.
FIG. 20(b) is another schematic diagram of a location of a DMRS on a time-frequency resource according to another embodiment.

As shown in FIG. 20(a), user equipment 1 and user equipment 2 may generate a DMRS on a same time domain symbol, where the DMRSs are mapped onto a same subcarrier. For the network device, there may be two methods for distinguishing a DMRS of the user equipment 1 from a DMRS of the user equipment 2. Exemplary methods are as follows:

Method 1: The DMRSs are not distinguished, that is, the user equipment 1 and the user equipment 2 use an exactly same DMRS, and the DMRSs include a same time-frequency resource and a same sequence. This method is implemented on the premise that the user equipment 1 and the user equipment 2 are QCL. QCL means that on an eNodeB eNB side, over-the-air transmission channel parameters (including multipath delay distribution, a Doppler offset value, a transmission delay, and the like) from the user equipment 1 and the user equipment 2 to the eNB side are the same or approximately the same. Therefore, the user equipment 1 and the user equipment 2 may share the same DMRS without performing distinguishing. Further, because the two user equipment share an exactly same DMRS resource, a value of transmit power used when the two user equipment send DMRSs needs to be indicated by using signaling, so as to ensure that an excessively high power superposition value is not generated after the DMRSs sent by the two user equipment are superposed on the eNB side. A transmit power value of a DMRS may be indicated by using an absolute value, or may be indicated by using a power deviation value between transmit power of the DMRS and that of a particular reference signal or that of uplink data to be sent on the DMRS.

Method 2: The DMRSs may be distinguished from each other, that is, the user equipment 1 and the user equipment 2 use different DMRSs. The DMRSs include a same time-frequency resource and different DMRS sequences, and may optionally include different transmit power values. The user equipment 1 and the user equipment 2 use different DMRS sequences, that is, the user equipment 1 and the user equipment 2 send respective DMRSs in a code division manner. Further, different transmit power may be allocated to the DMRSs of the user equipment 1 and the user equipment 2, and on an eNB side, a deviation value between transmit power of the DMRS of the user equipment 1 and that of the DMRS of the user equipment 2 needs to be relatively large. Therefore, DMRSs sent by the two user equipment are separately obtained by means of parsing by using an interference message technology. A transmit power value of a DMRS may be indicated by using an absolute value, or may be indicated by using a power deviation value between transmit power of the DMRS and that of a particular reference signal or that of uplink data to be sent on the DMRS.

As shown in FIG. 20(b), user equipment 1 and user equipment 2 may generate a DMRS on a same time domain symbol, and DMRSs are mapped onto different subcarriers. In other words, frequency division multiplexing (FDM) is performed on the DMRSs on one symbol. Further, on different user equipment sides, data may not be sent on a non-DMRS subcarrier in a DMRS symbol. For example, the user equipment 1 may use symbols 0 and 1, where on a DMRS symbol of the symbol 1, a DMRS sequence is placed on a subcarrier with an even number (0, 2, 4, or the like), and a subcarrier with an odd number is vacated without being placed any data or reference signal. Similarly, a case is the same for the user equipment 2. The user equipment 2 uses symbols 1 and 2, where on a DMRS symbol of the symbol 1, a DMRS sequence is placed on a subcarrier with an odd number (1, 3, 5, or the like), and a subcarrier with an even number is vacated without being placed any data or reference signal.

In this method, although the user equipment 1 and the user equipment 2 share a time domain symbol of a DMRS, the user equipment 1 and the user equipment 2 use different subcarriers in this symbol, and a non-DMRS subcarrier is vacated. Therefore, DMRSs are generated in frequency domain orthogonal manner.

Based on the above, according to the wireless communication method in this embodiment, DMRSs of different user equipment that are neighboring in terms of time domain resource are completely time-frequency orthogonal, so that better communication performance can be ensured.

In this embodiment, if user equipment that are neighboring in terms of time domain resource use a same symbol to generate a DMRS, then DMRSs generated by different user equipment on this symbol may be mapped onto a same subcarrier in frequency domain. As shown in FIG. 21, the method 4000 may further include the following step:

S4300. The network device sends DMRS transmit power indication information to the user equipment.

Correspondingly, S4200 may be: the network device receives the DMRS that is sent by the user equipment according to the DMRS transmit power indication information.

After the network device sends the DMRS transmit power indication information to the user equipment, the user equipment may generate the DMRS on a time-frequency resource stipulated in a standard or a time-frequency resource that is agreed on in advance by the user equipment and the network device, and send the generated DMRS according to transmit power indicated by the DMRS transmit power indication information.

In S4300, the DMRS transmit power indication information may be used to indicate transmit power used when the user equipment sends the DMRS. Optionally, the DMRS transmit power indication information may directly indicate a value of the transmit power used for sending the DMRS, or may indicate a power deviation value between transmit power used for sending the DMRS and transmit power of a particular reference signal, or may indicate a power deviation value between transmit power used for sending the DMRS and transmit power of data corresponding to the DMRS. This is not limited.

Based on the above, according to the wireless communication method in this embodiment, all the time domain symbols included in the subframe in which the time domain symbol is located are allocated to at least two user equipment, where the time domain symbol is used by the user equipment to generate the DMRS according to the configuration information sent by the network device. Therefore, an unnecessary delay in shortened-delay transmission can be avoided, and interference between DMRSs of different user equipment can be reduced.

With reference to FIG. 18 to FIG. 21, a wireless communication method in still another embodiment described in detail on a network device side above, and with reference to FIG. 22 and FIG. 23, a wireless communication method in still another embodiment described in detail on a user equipment side below. It may be understood that, interaction between user equipment and a network device, related features, related functions, and the like that are described on the network device side are corresponding to those described on the user equipment side. For brevity, repeated description is appropriately omitted.

Figure 22:
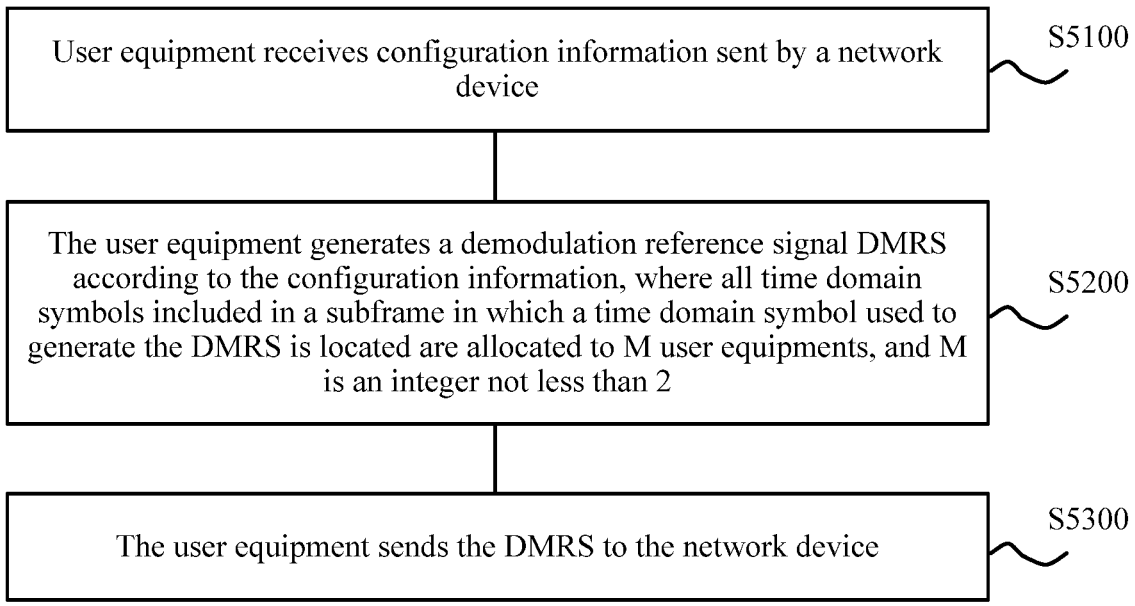
FIG. 22 is a schematic flowchart of a wireless communication method according to still another embodiment.

FIG. 22 is a schematic flowchart of a wireless communication method according to still another embodiment. The method may be performed by user equipment. As shown in FIG. 22, a method 5000 may include the following steps:

S5100. The user equipment receives configuration information sent by a network device.

S5200. The user equipment generates a demodulation reference signal DMRS according to the configuration information, where all time domain symbols included in a subframe in which a time domain symbol used to generate the DMRS is located are allocated to M user equipment, and M is an integer not less than 2.

S5300. The user equipment sends the DMRS to the network device.

After receiving the configuration information sent by the network device, the user equipment may generate the DMRS according to the configuration information, and send the DMRS to the network device. All the time domain symbols included in the subframe in which the time domain symbol used by the user equipment to generate the DMRS is located are allocated to at least two user equipment.

Based on the above, according to the wireless communication method in this embodiment, all the time domain symbols included in the subframe in which the time domain symbol is located are allocated to at least two user equipment, where the time domain symbol is used by the user equipment to generate the DMRS according to the configuration information sent by the network device. Therefore, an unnecessary delay in shortened-delay transmission can be avoided, and interference between DMRSs of different user equipment can be reduced.

In this embodiment, the DMRS may be mapped, at intervals of N subcarriers, onto a subcarrier on a frequency domain resource corresponding to the time domain symbol used to generate the DMRS, where N is a positive integer.

In this embodiment, N may be a total quantity of time domain symbols occupied by all DMRSs in the subframe in which the time domain symbol used to generate the DMRS is located.

In this embodiment, at least two of the M user equipment may use different time domain symbols to generate a DMRS.

In this embodiment, the M user equipment may include at least two user equipment that are neighboring in terms of time domain resource, and all of the at least two user equipment that are neighboring in terms of time domain resource use a same time domain symbol to generate a DMRS.

In this embodiment, DMRSs generated by all the user equipment may be mapped onto different subcarriers in frequency domain.

In this embodiment, DMRSs generated by all the user equipment may be mapped onto a same subcarrier in frequency domain. As shown in FIG. 23, the method may further include the following step:

S5400. The user equipment receives DMRS transmit power indication information sent by the network device.

Correspondingly, S5300 may be: the user equipment sends the DMRS to the network device according to the DMRS transmit power indication information.

Based on the above, according to the wireless communication method in this embodiment, all the time domain symbols included in the subframe in which the time domain symbol is located are allocated to at least two user equipment, where the time domain symbol is used by the user equipment to generate the DMRS according to the configuration information sent by the network device. Therefore, an unnecessary delay in shortened-delay transmission can be avoided, and interference between DMRSs of different user equipment can be reduced.

Figure 24:
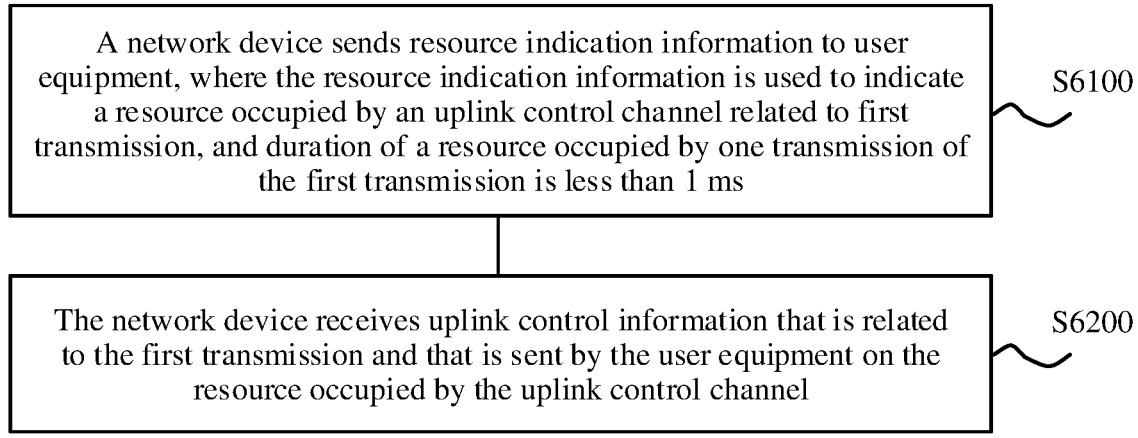
FIG. 24 is a schematic flowchart of a wireless communication method according to still another embodiment.

FIG. 24 is a schematic flowchart of a wireless communication method according to still another embodiment. The method may be performed by a network device. As shown in FIG. 24, a method 6000 may include the following steps:

S6100. The network device sends resource indication information to user equipment, where the resource indication information is used to indicate a resource occupied by an uplink control channel related to first transmission, and duration of occupying a resource by one transmission of the first transmission is less than 1 ms.

S6200. The network device receives uplink control information that is related to the first transmission and that is sent by the user equipment on the resource occupied by the uplink control channel.

The network device may send, to the user equipment, the resource indication information that indicates the resource occupied by the uplink control channel related to the first transmission, and receives the uplink control information that is related to the first transmission and that is sent by the user equipment on the resource occupied by the uplink control channel. The duration of occupying a resource by one transmission of the first transmission is less than 1 ms.

Based on the above, according to the wireless communication method in this embodiment, the network device may send, to the user equipment, the resource indication information of the resource occupied by the uplink control channel related to the first transmission, and receives the uplink control information that is related to the first transmission and that is sent by the user equipment on the resource occupied by the uplink control channel. Because the duration of occupying a resource by one transmission of the first transmission is less than 1 ms, a transmission delay can be shortened, user experience can be improved, and network performance can be enhanced.

In S6100, the resource indication information may include information about a number of a subframe in which the resource occupied by the uplink control channel related to the first transmission is located and/or information about a time domain symbol location and a frequency domain location in a subframe that are corresponding to the resource occupied by the uplink control channel related to the first transmission.

In this embodiment, the resource indication information indicates that the resource occupied by the uplink control channel is Fm first subcarriers on a first subband and Fn second subcarriers on a second subband, the first subband and the second subband are in bandwidth occupied by a physical uplink shared channel (PUSCH) in a first subframe, and are separated in frequency domain, where Fm and Fn are positive integers.

Based on the above, according to the wireless communication method in this embodiment, both an uplink control channel related to shortened-delay transmission and an uplink control channel related to non-shortened-delay transmission can exist in a same radio frame, and the uplink control channel related to shortened-delay transmission occupies a resource on a subband by means of occupation first in frequency domain and then in time domain, so that time domain resources occupied by an uplink control channel can be reduced.

In this embodiment, the first subband and the second subband may be located at two ends of the bandwidth occupied by the PUSCH.

In this embodiment, Fm may be equal to Fn, and locations of the Fm first subcarriers on the first subband may be the same as or symmetrical with locations of the Fn second subcarriers on the second subband.

Figure 25:
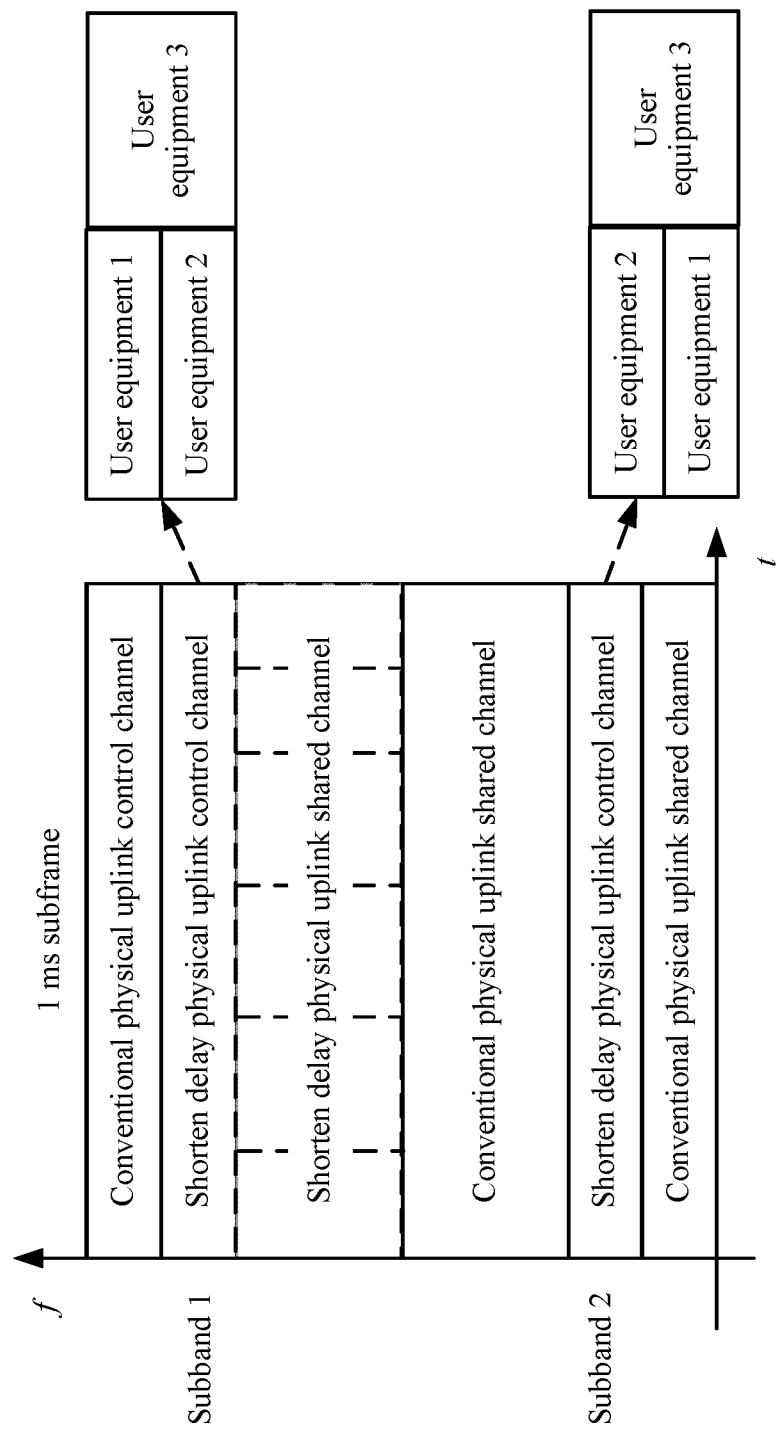
FIG. 25 is a schematic diagram of a location of an uplink control channel in system bandwidth according to an embodiment.

For example, as shown in FIG. 25, in a 1 ms subframe, an uplink control channel related to shortened-delay transmission occupies two separate sub-bands obtained by dividing a part except non-shorten delay PUCCH bandwidth, and uplink control channels of different user equipment occupy some subcarriers of some symbols. In addition, resources for the uplink control channels of the different user equipment are placed in REs on the two sub-bands in a same or symmetrical order. Symmetrical placement may be as follows: In FIG. 25, user equipment 1 is in a high-frequency subcarrier part of a subband 1, and in a low-frequency subcarrier part of a subband 2. Alternatively, placement in a same order is as follows: In FIG. 25, user equipment 2 is in a low-frequency subcarrier part of a subband 1, and in a low-frequency subcarrier part of a subband 2. That is, two shorten delay PUCCHs are separately sent on the subband 1 and the subband 2.

In this embodiment, time domain symbols corresponding to the Fm first subcarriers may be the same as time domain symbols corresponding to the Fn second subcarriers.

Based on the above, according to the wireless communication method in this embodiment, the network device sends, to the user equipment, the resource indication information of the resource occupied by the uplink control channel related to the first transmission, and receives the uplink control information that is related to the first transmission and that is sent by the user equipment on the resource occupied by the uplink control channel. Because the duration of occupying a resource by one transmission of the first transmission is less than 1 ms, a transmission delay can be shortened, user experience can be improved, and network performance can be enhanced.

With reference to FIG. 24 and FIG. 25, a wireless communication method in still another embodiment is described in detail on a network device side above, and with reference to FIG. 26 to FIG. 28, a wireless communication method in still another embodiment is described in detail on a user equipment side below. It may be understood that, interaction between user equipment and a network device, related features, related functions, and the like that are described on the network device side are corresponding to those described on the user equipment side. For brevity, repeated description is appropriately omitted.

FIG. 26 is a schematic flowchart of a wireless communication method according to still another embodiment. The method may be performed by user equipment. As shown in FIG. 26, a method 7000 may include the following steps:

S7100. The user equipment obtains a resource occupied by an uplink control channel related to first transmission, where duration of occupying a resource by one transmission of the first transmission is less than 1 ms.

S7200. The user equipment sends, on the resource occupied by the uplink control channel related to the first transmission, uplink control information related to the first transmission to a network device.

The user equipment may obtain the resource occupied by the uplink control channel related to the first transmission, and sends, on the resource, the uplink control information related to the first transmission to the network device. The duration of occupying a resource by one transmission of the first transmission is less than 1 ms.

Based on the above, according to the wireless communication method in this embodiment, the user equipment obtains the resource occupied by the uplink control channel related to the first transmission, and sends, on the resource, the uplink control information related to the first transmission to the network device. Because the duration of occupying a resource by one transmission of the first transmission is less than 1 ms, a transmission delay can be shortened, user experience can be improved, and network performance can be enhanced.

In this embodiment, the user equipment may obtain, according to a preset protocol, the resource occupied by the uplink control channel related to the first transmission, or may obtain, by receiving signaling sent by the network device, the resource occupied by the uplink control channel related to the first transmission.

In this embodiment, as shown in FIG. 27, the method 7000 may further include the following step:

S7300. The user equipment receives resource indication information sent by the network device.

Correspondingly, S7100 may include: obtaining, according to the resource indication information, the resource occupied by the uplink control channel related to the first transmission.

In S7300, the resource indication information may include information about a number of a subframe in which the resource occupied by the uplink control channel related to the first transmission is located and/or information about a time domain symbol location and a frequency domain location in a subframe that are corresponding to the resource occupied by the uplink control channel related to the first transmission.

In S7300, the resource indication information may indicate that the resource occupied by the uplink control channel related to the first transmission is Fm first subcarriers on a first subband and Fn second subcarriers on a second subband, the first subband and the second subband are in bandwidth occupied by a physical uplink shared channel (PUSCH) in a first subframe, and are separated in frequency domain, and Fm and Fn are positive integers.

Based on the above, according to the wireless communication method in this embodiment, both an uplink control channel related to shortened-delay transmission and an uplink control channel related to non-shortened-delay transmission can exist in a same radio frame, and the uplink control channel related to shortened-delay transmission occupies a resource on a subband by means of occupation first in frequency domain and then in time domain, so that time domain resources occupied by an uplink control channel can be reduced.

In this embodiment, the first subband and the second subband may be located at two ends of the bandwidth occupied by the PUSCH.

In this embodiment, Fm may be equal to Fn, and locations of the Fm first subcarriers on the first subband may be the same as or symmetrical with locations of the Fn second subcarriers on the second subband.

In this embodiment, time domain symbols corresponding to the Fm first subcarriers may be the same as time domain symbols corresponding to the Fn second subcarriers.

Figure 28:
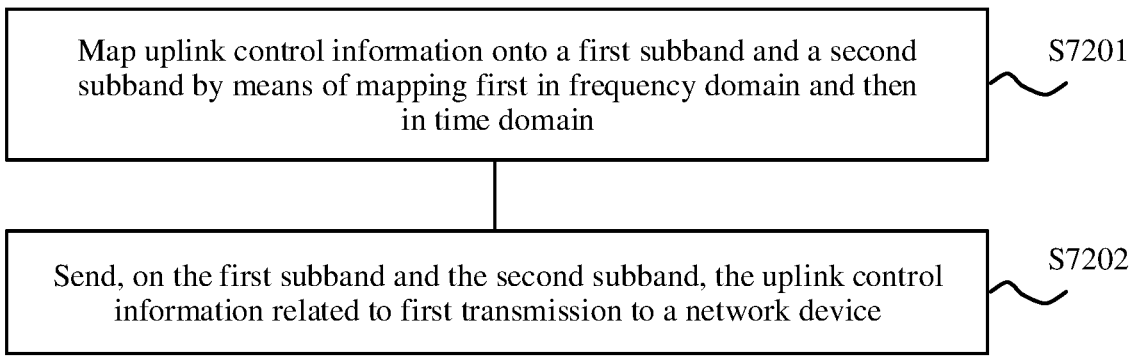
FIG. 28 is still another schematic flowchart of a wireless communication method according to still another embodiment.

As shown in FIG. 28, S7200 may include the following steps:

S7201. Map the uplink control information onto the first subband and the second subband by means of mapping first in frequency domain and then in time domain.

S7202. Send, on the first subband and the second subband, the uplink control information related to the first transmission to the network device.

Based on the above, according to the wireless communication method in this embodiment, the user equipment may obtain the resource occupied by the uplink control channel related to the first transmission, and send, on the resource, the uplink control information related to the first transmission to the network device. Because the duration of occupying a resource by one transmission of the first transmission is less than 1 ms, a transmission delay can be shortened, user experience can be improved, and network performance can be enhanced.

Figure 29:
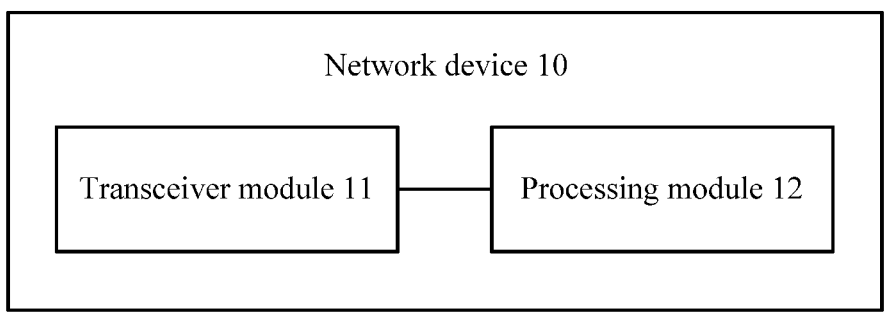
FIG. 29 is a schematic block diagram of a network device according to an embodiment.

With reference to FIG. 29, a network device in an embodiment is described in detail below. As shown in FIG. 29, a network device 10 may include:

a transceiver module 11, configured to send resource configuration information to user equipment, where the resource configuration information is used to indicate a first transmission resource corresponding to first transmission, and duration of a transmission resource occupied by one transmission of the first transmission is less than 1 millisecond; and a processing module 12, configured to control the transceiver module 11 to communicate with the user equipment based on the first transmission resource.

The network device sends, to the user equipment, the resource configuration information used to indicate the first transmission resource corresponding to the first transmission and communicates with the user equipment based on the first transmission resource. It may be understood that the duration of a transmission resource occupied by one transmission of the first transmission is less than 1 millisecond.

Based on the above, the network device for wireless communication in this embodiment may send, to the user equipment, the resource configuration information that indicates the first transmission resource corresponding to the first transmission, and communicate with the user equipment based on the first transmission resource. In this way, a communication delay between the network device and the user equipment can be shortened, user experience can be improved, and performance of a wireless network can be enhanced.

It may be understood that, in this embodiment, a receiving operation performed by the transceiver module 11 may be performed by a receiving module with a receiving function, and a sending operation performed by the transceiver module 11 may be performed by a sending module with a sending function.

In this embodiment, the first transmission resource occupies, in time domain, one or more subframes in a MBSFN subframe set.

In this embodiment, that the processing module 12 controls the transceiver module 11 to communicate with the user equipment based on the first transmission resource may include:

controlling the transceiver module 11 to send first resource indication information to the user equipment; and controlling the transceiver module 12 to receive uplink data that is sent by the user equipment in a first subframe, in a radio frame, determined according to the first resource indication information, where the first subframe in the radio frame is one of subframes occupied by the first transmission resource.

In this embodiment, the radio frame may further include a subframe used for second transmission. Duration of a transmission resource occupied by one transmission of the second transmission may be 1 ms.

In this embodiment, the transceiver module 11 may be further configured to: send feedback information to the user equipment in a second subframe in the radio frame, where the second subframe in the radio frame is one of the subframes occupied by the first transmission resource, and a time interval between the second subframe in the radio frame and the first subframe in the radio frame is greater than or equal to first duration; or send feedback information to the user equipment in a first subframe in the subframe used for the second transmission, where a time interval between the first subframe in the subframe used for the second transmission and the first subframe in the radio frame is greater than or equal to second duration.

In this embodiment, that the transceiver module 11 sends feedback information to the user equipment in a second subframe in the radio frame may include: sending, by the transceiver module 11, the feedback information to the user equipment in the second subframe in the radio frame when the processing module 12 determines that a transmission delay for sending the feedback information in the second subframe in the radio frame is less than or equal to a transmission delay for sending the feedback information in the first subframe in the subframe used for the second transmission.

In this embodiment, that the transceiver module 11 sends feedback information to the user equipment in a first subframe in the subframe used for the second transmission may include: when the processing module 12 determines that a transmission delay for sending the feedback information in the second subframe in the radio frame is greater than a transmission delay for sending the feedback information in the first subframe in the subframe used for the second transmission, sending, by the transceiver module 11, the feedback information to the user equipment in the first subframe in the subframe used for the second transmission.

In this embodiment, when the transceiver module 11 sends, to the user equipment, feedback information indicating that the uplink data is unsuccessfully received, the transceiver module 11 may be further configured to receive, at an interval of third duration from a moment at which the feedback information is sent, retransmission data sent by the user equipment.

In this embodiment, when the transceiver module 11 sends, to the user equipment, feedback information indicating that the uplink data is unsuccessfully received, the transceiver module 11 may be further configured to receive, in a third subframe in the radio frame, retransmission data sent by the user equipment, where the third subframe in the radio frame is one of the subframes occupied by the first transmission resource, and a time interval between the third subframe in the radio frame and a subframe used by the transceiver module 11 to send the feedback information is greater than or equal to fourth duration.

In this embodiment, that the processing module 12 controls the transceiver module to communicate with the user equipment based on the first transmission resource may include: controlling the transceiver module 11 to send second resource indication information to the user equipment to enable the user equipment to receive downlink data in a first subframe that is determined according to the second resource indication information, where the first subframe is one of subframes occupied by the first transmission resource; and controlling the transceiver module 11 to send the downlink data to the user equipment in the first subframe.

In this embodiment, that the processing module 12 controls the transceiver module 11 to communicate with the user equipment based on the first transmission resource may include: controlling the transceiver module 11 to send configuration information to the user equipment; and controlling the transceiver module 11 to receive a DMRS that is sent by the user equipment on a transmission resource in the first transmission resource according to the configuration information.

In this embodiment, the configuration information may include at least one of the following information: indication information used to indicate a location of a time domain symbol used by the user equipment to generate the DMRS, indication information used to indicate a frequency domain location at which the user equipment generates the DMRS, or indication information used to indicate transmit power for sending the DMRS by the user equipment.

In this embodiment, that the processing module 12 controls the transceiver module 11 to communicate with the user equipment based on the first transmission resource may include: controlling the transceiver module 11 to send uplink control channel resource indication information to the user equipment, where the uplink control channel resource indication information indicates a time domain symbol location and a frequency domain location in a first subframe, the time symbol domain location and the frequency domain being both for an uplink control channel related to the first transmission, and the first subframe is one of subframes occupied by the first transmission resource; and controlling the transceiver module 11 to receive, in the first subframe, uplink control information that is related to the first transmission and that is sent by the user equipment according to the uplink control channel resource indication information.

It may be understood that, the network device 10 in this embodiment may correspondingly perform the wireless communication method 1000 in the embodiment, and the foregoing and other operations and/or functions of the modules in the network device 10 may be separately used to implement corresponding procedures in FIG. 4 to FIG. 10. For brevity, details are not described herein again.

Based on the above, the network device for wireless communication in this embodiment may send, to the user equipment, the resource configuration information that indicates the first transmission resource corresponding to the first transmission, and communicate with the user equipment based on the first transmission resource. In this way, a communication delay between the network device and the user equipment can be shortened, user experience can be improved, and performance of a wireless network can be enhanced.

Figure 30:
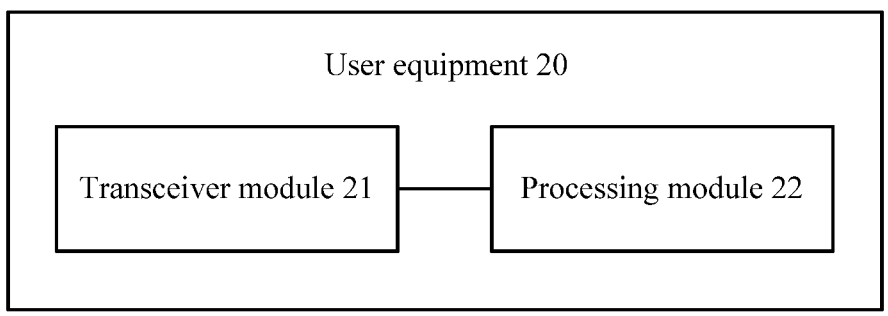
FIG. 30 is a schematic block diagram of user equipment according to an embodiment.

With reference to FIG. 30, user equipment in an embodiment is described in detail below. As shown in FIG. 30, user equipment 20 may include:

a transceiver module 21, configured to receive resource configuration information sent by a network device, where the resource configuration information is used to indicate a first transmission resource corresponding to first transmission, and duration of a transmission resource occupied by one transmission of the first transmission is less than 1 millisecond; and a processing module 22, configured to control the transceiver module 21 to communicate with the network device based on the first transmission resource.

The user equipment may receive the resource configuration information that is sent by the network device and that is used to indicate the first transmission resource corresponding to the first transmission, and communicates with the network device based on the first transmission resource. It may be understood that, the duration of a transmission resource occupied by one transmission of the first transmission is less than 1 millisecond.

Based on the above, the user equipment in this embodiment receives the resource configuration information that is sent by the network device and that is used to indicate the first transmission resource corresponding to the first transmission, and communicates with the network device based on the first transmission resource. In this way, a communication delay between the network device and the user equipment can be shortened, user experience can be improved, and performance of a wireless network can be enhanced.

It may be understood that, in this embodiment, a receiving operation performed by the transceiver module 21 may be performed by a receiving module with a receiving function, and a sending operation performed by the transceiver module 21 may be performed by a sending module with a sending function.

In this embodiment, the first transmission resource may occupy, in time domain, one or more subframes in a MBSFN subframe set.

In this embodiment, that the processing module 22 controls the transceiver module 21 to communicate with the network device based on the first transmission resource may include:

controlling the transceiver module 21 to receive first resource indication information sent by the network device; and controlling the transceiver module 21 to send uplink data to the network device in a first subframe, in a radio frame, determined according to the first resource indication information, where the first subframe in the radio frame is one of subframes occupied by the first transmission resource.

In this embodiment, the radio frame may further include a subframe used for second transmission. Duration of a transmission resource occupied by one transmission of the second transmission is 1 ms.

In this embodiment, the transceiver module 21 may be further configured to receive, in a second subframe in the radio frame, feedback information sent by the network device, where the second subframe in the radio frame is one of the subframes occupied by the first transmission resource, and a time interval between the second subframe in the radio frame and the first subframe in the radio frame is greater than or equal to first duration.

In this embodiment, the transceiver module 21 may be further configured to receive, in a first subframe in the subframe used for the second transmission, feedback information sent by the network device, where a time interval between the first subframe in the subframe used for the second transmission and the first subframe in the radio frame is greater than or equal to second duration.

In this embodiment, when the transceiver module 21 receives feedback information that is sent by the network device and that indicates that the network device unsuccessfully receives the uplink data, the transceiver module 21 may be further configured to:

send retransmission data to the network device at an interval of third duration from a moment at which the feedback information is received; or send retransmission data to the network device in a third subframe in the radio frame, where the third subframe in the radio frame is one of the subframes occupied by the first transmission resource, and a time interval between the third subframe in the radio frame and a subframe used by the transceiver module 21 to receive the feedback information is greater than or equal to fourth duration.

In this embodiment, that the transceiver module 21 sends retransmission data to the network device at an interval of third duration from a moment at which the feedback information is received may include: when the processing module 22 determines that the third duration is less than the time interval between the third subframe in the radio frame and the subframe used by the transceiver module 21 to receive the feedback information, sending, by the transceiver module 21, the retransmission data to the network device at the interval of the third duration from the moment at which the feedback information is received.

In this embodiment, that the transceiver module 21 sends retransmission data to the network device in a third subframe in the radio frame may include: sending, by the transceiver module 21, the retransmission data to the network device in the third subframe in the radio frame when the processing module 22 determines that the third duration is greater than or equal to the time interval between the third subframe in the radio frame and the subframe used by the transceiver module 21 to receive the feedback information.

In this embodiment, that the processing module 22 controls the transceiver module 21 to communicate with the network device based on the first transmission resource may include:

controlling the transceiver module 21 to receive second resource indication information sent by the network device; and controlling the transceiver module 21 to receive, in a first subframe that is determined according to the second resource indication information, downlink data sent by the network device, where the first subframe is one of subframes occupied by the first transmission resource.

In this embodiment, that the processing module 22 controls the transceiver module 21 to communicate with the network device based on the first transmission resource may include:

controlling the transceiver module 21 to receive configuration information sent by the network device; and controlling the transceiver module 21 to send a DMRS to the network device on a transmission resource in the first transmission resource according to the configuration information.

In this embodiment, the configuration information may include at least one of the following information: indication information used to indicate a location of a time domain symbol used by the user equipment to generate the DMRS, indication information used to indicate a frequency domain location at which the user equipment generates the DMRS, or indication information used to indicate transmit power for sending the DMRS by the user equipment.

In this embodiment, that the processing module 22 controls the transceiver module 21 to communicate with the network device based on the first transmission resource may include: controlling the transceiver module 21 to receive uplink control channel resource indication information sent by the network device, where the uplink control channel resource indication information indicates a time domain symbol location and a frequency domain location in a first subframe, the time symbol domain location and the frequency domain being both for an uplink control channel related to the first transmission, and the first subframe is one of subframes occupied by the first transmission resource; and controlling the transceiver module 21 to send, in the first subframe according to the uplink control channel resource indication information, uplink control information related to the first transmission to the network device.

It may be understood that, the user equipment 20 in this embodiment may correspondingly perform the wireless communication method 3000 in the embodiment, and the foregoing and other operations and/or functions of the modules in the user equipment 20 may be separately used to implement corresponding procedures in FIG. 11 to FIG. 17. For brevity, details are not described herein again.

Based on the above, the user equipment in this embodiment receives the resource configuration information that is sent by the network device and that is used to indicate the first transmission resource corresponding to the first transmission, and communicates with the network device based on the first transmission resource. In this way, a communication delay between the network device and the user equipment can be shortened, user experience can be improved, and performance of a wireless network can be enhanced.

Figure 31:
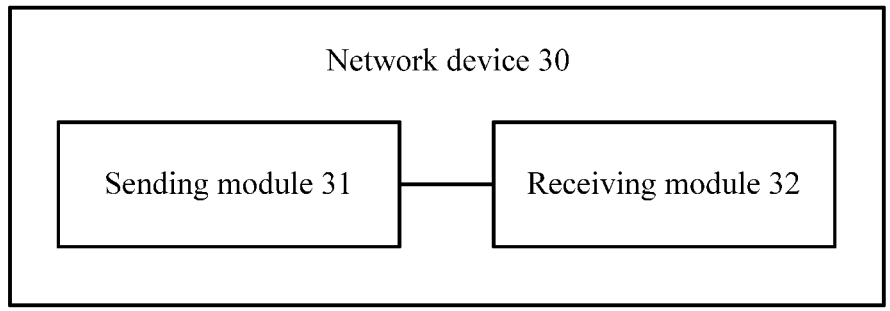
FIG. 31 is a schematic block diagram of a network device according to another embodiment.

With reference to FIG. 31, a network device in another embodiment is described in detail below. As shown in FIG. 31, a network device 30 may include:

a sending module 31, configured to send configuration information to user equipment; and a receiving module 32, configured to receive a demodulation reference signal (DMRS) that is generated according to the configuration information and that is sent by the user equipment, where all time domain symbols included in a subframe in which a time domain symbol used by the user equipment to generate the DMRS is located are allocated to M user equipment, where M is an integer not less than 2.

After sending, to the user equipment, the configuration information used by the user equipment to generate the DMRS, the network device may receive the DMRS that is generated by the user equipment according to the configuration information, and all the time domain symbols included in the subframe in which the time domain symbol used by the user equipment to generate the DMRS is located may be allocated to at least two user equipment.

Based on the above, the network device in this embodiment may send the configuration information to the user equipment. All the time domain symbols included in the subframe in which the time domain symbol is located may be allocated to at least two user equipment, where the time domain symbol is used by the user equipment to generate the DMRS according to the configuration information sent by the network device. Therefore, an unnecessary delay in shortened-delay transmission can be avoided, and interference between DMRSs of different user equipment can be reduced.

It may be understood that, in this embodiment, a sending operation performed by the sending module 31 and a receiving operation performed by the receiving module 32 may be performed by a transceiver module with receiving and sending functions.

In this embodiment, the DMRS may be mapped, at intervals of N subcarriers, onto a subcarrier on a frequency domain resource corresponding to the time domain symbol used by the user equipment to generate the DMRS, where N is a positive integer.

In this embodiment, N may be a total quantity of time domain symbols occupied by all DMRSs in the subframe in which the time domain symbol used by the user equipment to generate the DMRS is located.

In this embodiment, at least two of the M user equipment may use different time domain symbols to generate a DMRS.

In this embodiment, the M user equipment may include at least two user equipment that are neighboring in terms of time domain resource, and all of the at least two user equipment that are neighboring in terms of time domain resource may use a same time domain symbol to generate a DMRS.

In this embodiment, DMRSs generated by all the user equipment are mapped onto different subcarriers in frequency domain.

In this embodiment, DMRSs generated by all the user equipment are mapped onto a same subcarrier in frequency domain. The sending module 31 is further configured to send DMRS transmit power indication information to the user equipment.

That the receiving module 32 receives a DMRS that is generated according to the configuration information and that is sent by the user equipment may include: receiving the DMRS that is sent by the user equipment according to the DMRS transmit power indication information.

It may be understood that, the network device 30 in this embodiment may correspondingly perform the wireless communication method 4000 in the embodiment, and the foregoing and other operations and/or functions of the modules in the network device 30 are separately used to implement corresponding procedures in FIG. 18 to FIG. 21. For brevity, details are not described herein again.

Based on the above, the network device in this embodiment may send the configuration information to the user equipment. All the time domain symbols included in the subframe in which the time domain symbol is located are allocated to at least two user equipment, where the time domain symbol is used by the user equipment to generate the DMRS according to the configuration information sent by the network device. Therefore, an unnecessary delay in shortened-delay transmission can be avoided, and interference between DMRSs of different user equipment can be reduced.

Figure 32:
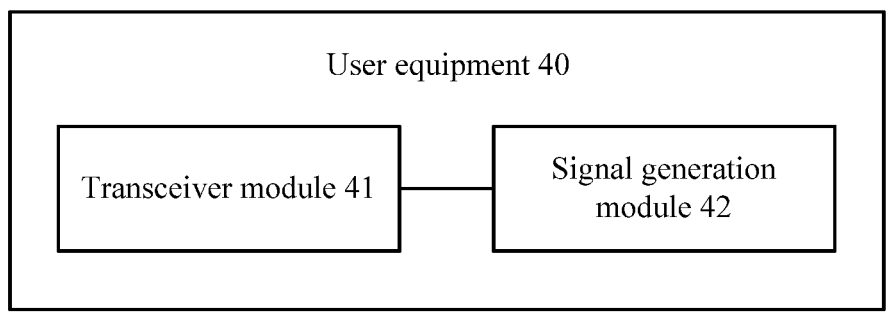
FIG. 32 is a schematic block diagram of user equipment according to another embodiment.

With reference to FIG. 32, user equipment in another embodiment is described in detail below. As shown in FIG. 32, a user equipment 40 may include:

a transceiver module 41, configured to receive configuration information sent by a network device; and a signal generation module 42, configured to generate a DMRS according to the configuration information, where all time domain symbols included in a subframe in which a time domain symbol used to generate the DMRS is located are allocated to M user equipment, where M is an integer not less than 2.

The transceiver module 41 may be further configured to send the DMRS to the network device.

After receiving the configuration information sent by the network device, the user equipment may generate the DMRS according to the configuration information, and send the DMRS to the network device. All the time domain symbols included in the subframe in which the time domain symbol used by the user equipment to generate the DMRS is located may be allocated to at least two user equipment.

Based on the above, the user equipment in this embodiment may generate the DMRS according to the configuration information received from the network device, and send the DMRS to the network device. All the time domain symbols included in the subframe in which the time domain symbol is located are allocated to at least two user equipment, where the time domain symbol is used by the user equipment to generate the DMRS according to the configuration information sent by the network device. Therefore, an unnecessary delay in shortened-delay transmission can be avoided, and interference between DMRSs of different user equipment can be reduced.

It may be understood that, in this embodiment, a receiving operation performed by the transceiver module 41 may be performed by a receiving module with a receiving function, and a sending operation performed by the transceiver module 41 may be performed by a sending module with a sending function.

In this embodiment, the DMRS may be mapped, at intervals of N subcarriers, onto a subcarrier on a frequency domain resource corresponding to the time domain symbol used to generate the DMRS, where N is a positive integer.

In this embodiment, N is a total quantity of time domain symbols occupied by all DMRSs in the subframe in which the time domain symbol used to generate the DMRS is located.

In this embodiment, at least two of the M user equipment may use different time domain symbols to generate a DMRS.

In this embodiment, the M user equipment may include at least two user equipment that are neighboring in terms of time domain resource, and all of the at least two user equipment that are neighboring in terms of time domain resource may use a same time domain symbol to generate a DMRS.

In this embodiment, DMRSs generated by all the user equipment may be mapped onto different subcarriers in frequency domain.

In this embodiment, DMRSs generated by all the user equipment may be mapped onto a same subcarrier in frequency domain. The transceiver module 41 may be further configured to:

receive DMRS transmit power indication information sent to the network device; and send the DMRS to the network device according to the DMRS transmit power indication information.

Figure 23:
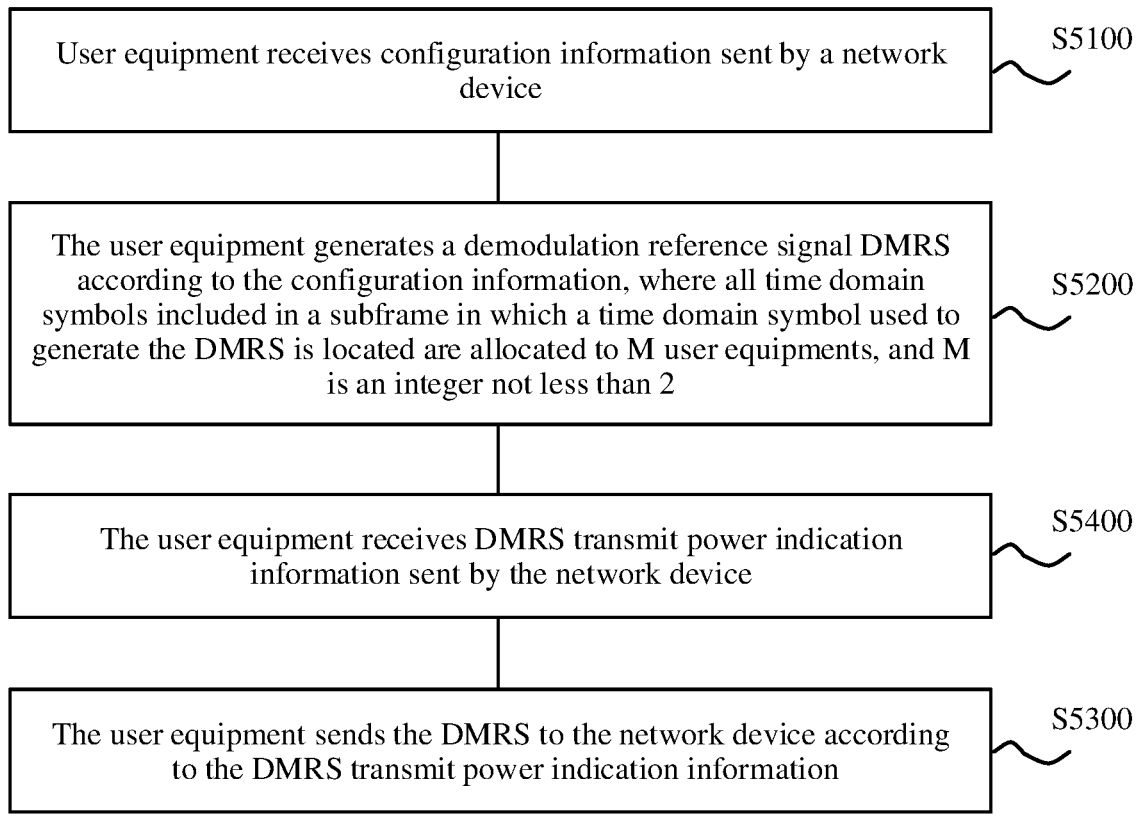
FIG. 23 is another schematic flowchart of a wireless communication method according to still another embodiment.

It may be understood that, the user equipment 40 in this embodiment may correspondingly perform the wireless communication method 5000 in the embodiment, and the foregoing and other operations and/or functions of the modules in the user equipment 40 may be separately used to implement corresponding procedures in FIG. 22 and FIG. 23. For brevity, details are not described herein again.

Based on the above, the user equipment in this embodiment may generate the DMRS according to the configuration information received from the network device and send the DMRS to the network device. All the time domain symbols included in the subframe in which the time domain symbol is located are allocated to at least two user equipment, where the time domain symbol is used by the user equipment to generate the DMRS according to the configuration information sent by the network device. Therefore, an unnecessary delay in shortened-delay transmission can be avoided, and interference between DMRSs of different user equipment can be reduced.

Figure 33:
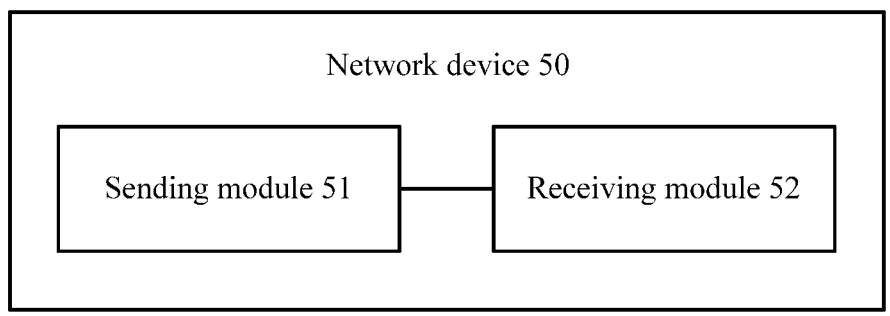
FIG. 33 is a schematic block diagram of a network device according to still another embodiment.

With reference to FIG. 33, a network device in still another embodiment is described in detail below. As shown in FIG. 33, a network device 50 may include:

a sending module 51, configured to send resource indication information to user equipment, where the resource indication information is used to indicate a resource occupied by an uplink control channel related to first transmission, and duration of occupying a resource by one transmission of the first transmission is less than 1 ms; and a receiving module 52, configured to receive uplink control information that is related to the first transmission and that is sent by the user equipment on the resource occupied by the uplink control channel.

The network device may send, to the user equipment, the resource indication information that indicates the resource occupied by the uplink control channel related to the first transmission, and receive the uplink control information that is related to the first transmission and that is sent by the user equipment on the resource occupied by the uplink control channel. The duration of occupying a resource by one transmission of the first transmission may be less than 1 ms.

Based on the above, the network device in this embodiment may send, to the user equipment, the resource indication information of the resource occupied by the uplink control channel related to the first transmission, and receive the uplink control information that is related to the first transmission and that is sent by the user equipment on the resource occupied by the uplink control channel. Because the duration of occupying a resource by one transmission of the first transmission is less than 1 ms, a transmission delay can be shortened, user experience can be improved, and network performance can be enhanced.

It may be understood that, in this embodiment, a sending operation performed by the sending module 51 and a receiving operation performed by the receiving module 52 may be performed by a transceiver module with receiving and sending functions.

In this embodiment, the resource indication information may include information about a number of a subframe in which the resource occupied by the uplink control channel related to the first transmission is located and/or information about a time domain symbol location and a frequency domain location in a subframe that are corresponding to the resource occupied by the uplink control channel related to the first transmission.

In this embodiment, the resource indication information may indicate that the resource occupied by the uplink control channel is Fm first subcarriers on a first subband and Fn second subcarriers on a second subband, the first subband and the second subband are in bandwidth occupied by a physical uplink shared channel (PUSCH) in a first subframe, and are separated in frequency domain, and Fm and Fn are positive integers.

In this embodiment, the first subband and the second subband may be located at two ends of the bandwidth occupied by the PUSCH.

In this embodiment, Fm may be equal to Fn, and locations of the Fm first subcarriers on the first subband may be the same as or symmetrical with locations of the Fn second subcarriers on the second subband.

In this embodiment, time domain symbols corresponding to the Fm first subcarriers may be the same as time domain symbols corresponding to the Fn second subcarriers.

It may be understood that, the network device 50 in this embodiment may correspondingly perform the wireless communication method 6000 in the embodiment, and the foregoing and other operations and/or functions of the modules in the network device 50 may be separately used to implement corresponding procedures in FIG. 24. For brevity, details are not described herein again.

Based on the above, the network device in this embodiment may send, to the user equipment, the resource indication information of the resource occupied by the uplink control channel related to the first transmission, and receive the uplink control information that is related to the first transmission and that is sent by the user equipment on the resource occupied by the uplink control channel. Because the duration of occupying a resource by one transmission of the first transmission is less than 1 ms, a transmission delay can be shortened, user experience can be improved, and network performance can be enhanced.

Figure 34:
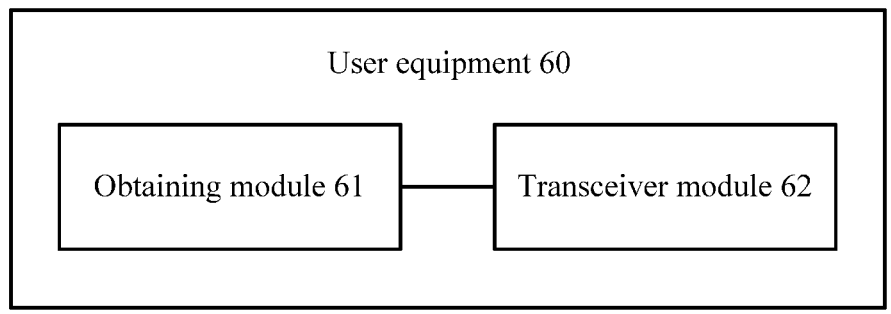
FIG. 34 is a schematic block diagram of user equipment according to still another embodiment.

With reference to FIG. 34, user equipment in still another embodiment is described in detail below. As shown in FIG. 34, user equipment 60 may include:

an obtaining module 61, configured to obtain a resource occupied by an uplink control channel related to first transmission, where duration of occupying a resource by one transmission of the first transmission is less than 1 ms; and a transceiver module 62, configured to send, on the resource occupied by the uplink control channel related to the first transmission, uplink control information related to the first transmission to a network device.

The user equipment may obtain the resource occupied by the uplink control channel related to the first transmission, and send, on the resource, the uplink control information related to the first transmission to the network device. The duration of occupying a resource by one transmission of the first transmission is less than 1 ms.

Based on the above, the user equipment in this embodiment may obtain the resource occupied by the uplink control channel related to the first transmission, and send, on the resource, the uplink control information related to the first transmission to the network device. Because the duration of occupying a resource by one transmission of the first transmission is less than 1 ms, a transmission delay can be shortened, user experience can be improved, and network performance can be enhanced.

It may be understood that, in this embodiment, a receiving operation performed by the transceiver module 62 may be performed by a receiving module with a receiving function, and a sending operation performed by the transceiver module 62 may be performed by a sending module with a sending function.

In this embodiment, the transceiver module 62 may be further configured to receive resource indication information sent by the network device.

That the obtaining module 61 obtains a resource occupied by an uplink control channel related to first transmission may include:

obtaining, according to the resource indication information, the resource occupied by the uplink control channel related to the first transmission.

In this embodiment, the resource indication information may include information about a number of a subframe in which the resource occupied by the uplink control channel related to the first transmission is located and/or information about a time domain symbol location and a frequency domain location in a subframe that are corresponding to the resource occupied by the uplink control channel related to the first transmission.

In this embodiment, the resource indication information may indicate that the resource occupied by the uplink control channel related to the first transmission is Fm first subcarriers on a first subband and Fn second subcarriers on a second subband, the first subband and the second subband may be in bandwidth occupied by a PUSCH in a first subframe, and are separated in frequency domain, where Fm and Fn are positive integers.

In this embodiment, the first subband and the second subband may be located at two ends of the bandwidth occupied by the PUSCH.

In this embodiment, Fm may be equal to Fn, and locations of the Fm first subcarriers on the first subband may be the same as or symmetrical with locations of the Fn second subcarriers on the second subband.

In this embodiment, time domain symbols corresponding to the Fm first subcarriers may be the same as time domain symbols corresponding to the Fn second subcarriers.

In this embodiment, that the transceiver module 62 sends, on the resource occupied by the uplink control channel related to the first transmission, uplink control information related to the first transmission to a network device may include:

mapping the uplink control information onto the first subband and the second subband by means of mapping first in frequency domain and then in time domain; and sending, on the first subband and the second subband, the uplink control information related to the first transmission to the network device.

It may be understood that, the user equipment 60 in this may correspondingly perform the wireless communication method 7000 in the embodiment, and the foregoing and other operations and/or functions of the modules in the user equipment 60 may be separately used to implement corresponding procedures in FIG. 26 to FIG. 28. For brevity, details are not described herein again.

Based on the above, the user equipment in this embodiment may obtain the resource occupied by the uplink control channel related to the first transmission, and send, on the resource, the uplink control information related to the first transmission to the network device. Because the duration of occupying a resource by one transmission of the first transmission is less than 1 ms, a transmission delay can be shortened, user experience can be improved, and network performance can be enhanced.

An embodiment may further provide a wireless communications system, including the network device 10 shown in FIG. 29 and the user equipment 20 shown in FIG. 30. The network device 10 may correspondingly perform the wireless communication method 1000 in the embodiment, and the foregoing and other operations and/or functions of the modules in the network device 10 may be separately used to implement corresponding procedures in FIG. 4 to FIG. 10. The user equipment 20 may correspondingly perform the wireless communication method 3000 in the embodiment, and the foregoing and other operations and/or functions of the modules in the user equipment 20 may be separately used to implement corresponding procedures in FIG. 11 to FIG. 17. For brevity, details are not described herein again.

An embodiment may further provide a wireless communications system, including the network device 30 shown in FIG. 31 and the user equipment 40 shown in FIG. 32. The network device 30 may correspondingly perform the wireless communication method 4000 in the embodiment, and the foregoing and other operations and/or functions of the modules in the network device 30 may be separately used to implement corresponding procedures in FIG. 18 to FIG. 21. The user equipment 40 may correspondingly perform the wireless communication method 5000 in the embodiment, and the foregoing and other operations and/or functions of the modules in the user equipment 40 may be separately used to implement corresponding procedures in FIG. 22 and FIG. 23. For brevity, details are not described herein again.

The embodiments further provide a wireless communications system, which may include the network device 50 shown in FIG. 33 and the user equipment 60 shown in FIG. 34. The network device 50 may correspondingly perform the wireless communication method 6000 in the embodiment, and the foregoing and other operations and/or functions of the modules in the network device 50 may be separately used to implement corresponding procedures in FIG. 24. The user equipment 60 may correspondingly perform the wireless communication method 7000 in the embodiment, and the foregoing and other operations and/or functions of the modules in the user equipment 60 may be separately used to implement corresponding procedures in FIG. 26 to FIG. 28. For brevity, details are not described herein again.

Figure 35:
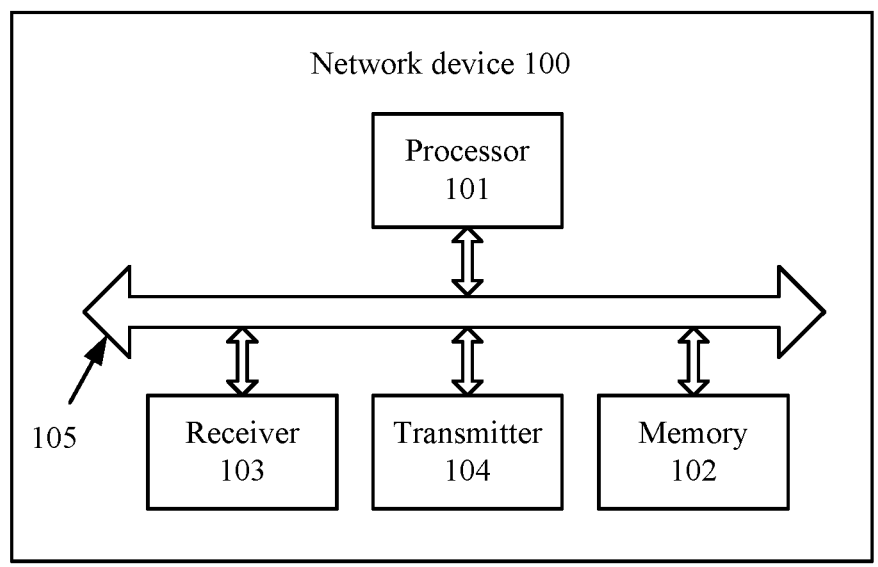
FIG. 35 is a schematic block diagram of a network device according to still another embodiment.

As shown in FIG. 35, an embodiment may further provide a network device 100, and the network device 100 may include a processor 101, a memory 102, a receiver 103, a transmitter 104, and a bus system 105. The bus system 105 is optional. The processor 101, the memory 102, the receiver 103, and the transmitter 104 may be connected by using the bus system 105. The memory 102 is configured to store an instruction. The processor 101 is configured to execute the instruction stored in the memory 102, so as to control the receiver 103 to receive a signal and control the transmitter 104 to send a signal. The transmitter 104 is configured to send resource configuration information to user equipment, where the resource configuration information is used to indicate a first transmission resource corresponding to first transmission, and duration of a transmission resource occupied by one transmission of the first transmission is less than 1 millisecond. The processor 101 is configured to control the receiver 103 and the transmitter 104 to communicate with the user equipment based on the first transmission resource.

Based on the above, the network device for wireless communication in this embodiment may send, to the user equipment, the resource configuration information that indicates the first transmission resource corresponding to the first transmission, and communicate with the user equipment based on the first transmission resource. In this way, a communication delay between the network device and the user equipment can be shortened, user experience can be improved, and performance of a wireless network can be enhanced.

It may be understood that, in this embodiment, the processor 101 may be a central processing unit (CPU), or the processor 101 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

The memory 102 may include a read-only memory (ROM) and a random access memory (RAM), and provide an instruction and data for the processor 101. A part of the memory 102 may further include a nonvolatile RAM. For example, the memory 102 may further store information about a device type.

In addition to a data bus, the bus system 105 may include a power bus, a control bus, a status signal bus, and the like. However, for clear description, various types of buses in the diagram are marked as the bus system 105.

In an implementation process, the steps in the foregoing method may be completed by using an integrated logic circuit of hardware in the processor 101 or an instruction in a form of software. The steps of the method disclosed with reference to the embodiment may be directly performed by a hardware processor, or may be performed by using a combination of the hardware in the processor and a software module. The software module may be located in a mature storage medium in the field, such as a RAM, a flash memory, a ROM, a programmable ROM, an electrically-erasable programmable memory, or a register. The storage medium is located in the memory 102. The processor 101 reads information from the memory 102, and completes the steps of the foregoing method in combination with the hardware in the processor 101. To avoid repetition, details are not described herein again.

In an embodiment, the first transmission resource may occupy, in time domain, one or more subframes in a MBSFN subframe set.

In an embodiment, that the processor 101 controls the receiver 103 and the transmitter 104 to communicate with the user equipment based on the first transmission resource may include:

controlling the transmitter 104 to send first resource indication information to the user equipment; and controlling the receiver 103 to receive uplink data that is sent by the user equipment in a first subframe, in a radio frame, determined according to the first resource indication information, where the first subframe in the radio frame is one of subframes occupied by the first transmission resource.

In an embodiment, the radio frame may further include a subframe used for second transmission. Duration of a transmission resource occupied by one transmission of the second transmission is 1 ms.

In an embodiment, the transmitter 104 may be further configured to:

send feedback information to the user equipment in a second subframe in the radio frame, where the second subframe in the radio frame is one of the subframes occupied by the first transmission resource, and a time interval between the second subframe in the radio frame and the first subframe in the radio frame is greater than or equal to first duration; or send feedback information to the user equipment in a first subframe in the subframe used for the second transmission, where a time interval between the first subframe in the subframe used for the second transmission and the first subframe in the radio frame is greater than or equal to second duration.

In an embodiment, that the transmitter 104 sends feedback information to the user equipment in a second subframe in the radio frame may include: sending, by the transmitter 104, the feedback information to the user equipment in the second subframe in the radio frame when the processor 101 determines that a transmission delay for sending the feedback information in the second subframe in the radio frame is less than or equal to a transmission delay for sending the feedback information in the first subframe in the subframe used for the second transmission.

In an embodiment, that the transmitter 104 sends feedback information to the user equipment in a first subframe in the subframe used for the second transmission may include: when the processor 101 determines that a transmission delay for sending the feedback information in the second subframe in the radio frame is greater than a transmission delay for sending the feedback information in the first subframe in the subframe used for the second transmission, sending, by the transmitter 104, the feedback information to the user equipment in the first subframe in the subframe used for the second transmission.

In an embodiment, when the transmitter 104 sends, to the user equipment, feedback information indicating that the uplink data is unsuccessfully received, the receiver 103 may be further configured to receive, at an interval of third duration from a moment at which the feedback information is sent, retransmission data sent by the user equipment.

In an embodiment, when the transmitter 104 sends, to the user equipment, feedback information indicating that the uplink data is unsuccessfully received, the receiver 103 may be further configured to receive, in a third subframe in the radio frame, retransmission data sent by the user equipment, where the third subframe in the radio frame is one of the subframes occupied by the first transmission resource, and a time interval between the third subframe in the radio frame and a subframe used by the transmitter 104 to send the feedback information is greater than or equal to fourth duration.

In an embodiment, that the processor 101 controls the receiver 103 and the transmitter 104 to communicate with the user equipment based on the first transmission resource may include:

controlling the transmitter 104 to send second resource indication information to the user equipment to enable the user equipment to receive downlink data in a first subframe that is determined according to the second resource indication information, where the first subframe is one of subframes occupied by the first transmission resource; and controlling the transmitter 104 to send the downlink data to the user equipment in the first subframe.

In an embodiment, that the processor 101 controls the receiver 103 and the transmitter 104 to communicate with the user equipment based on the first transmission resource may include:

controlling the transmitter 104 to send configuration information to the user equipment; and controlling the transmitter 103 to receive a DMRS that is sent by the user equipment on a transmission resource in the first transmission resource according to the configuration information.

In an embodiment, the configuration information includes at least one of the following information: indication information used to indicate a location of a time domain symbol used by the user equipment to generate the DMRS, indication information used to indicate a frequency domain location at which the user equipment generates the DMRS, or indication information used to indicate transmit power for sending the DMRS by the user equipment.

In an embodiment, that the processor 101 controls the receiver 103 and the transmitter 104 to communicate with the user equipment based on the first transmission resource may include:

controlling the transmitter 104 to send uplink control channel resource indication information to the user equipment, where the uplink control channel resource indication information indicates a time domain symbol location and a frequency domain location in a first subframe, the time symbol domain location and the frequency domain being both for an uplink control channel related to the first transmission, and the first subframe is one of subframes occupied by the first transmission resource; and controlling the receiver 103 to receive, in the first subframe, uplink control information that is related to the first transmission and that is sent by the user equipment according to the uplink control channel resource indication information.

It may be understood that, the network device 100 in this embodiment may correspond to the network device 10 in the embodiment, and may correspond to an entity for performing a method in an embodiment. In addition, the foregoing and other operations and/or functions of the modules in the network device 100 may be separately used to implement corresponding procedures in FIG. 4 to FIG. 10. For brevity, details are not described herein again.

Based on the above, the network device for wireless communication in this embodiment may send, to the user equipment, the resource configuration information that indicates the first transmission resource corresponding to the first transmission, and communicate with the user equipment based on the first transmission resource. In this way, a communication delay between the network device and the user equipment can be shortened, user experience can be improved, and performance of a wireless network can be enhanced.

Figure 36:
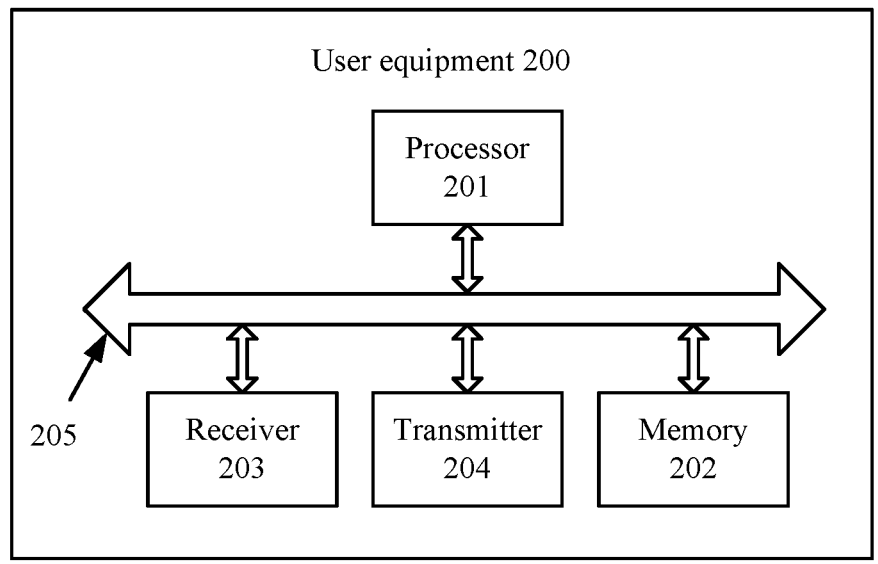
FIG. 36 is a schematic block diagram of user equipment according to still another embodiment.

As shown in FIG. 36, an embodiment may further provide user equipment 200, where the user equipment 200 includes a processor 201, a memory 202, a receiver 203, a transmitter 204, and a bus system 205. The bus system 205 is optional. The processor 201, the memory 202, the receiver 203, and the transmitter 204 may be connected by using the bus system 205. The memory 202 is configured to store an instruction. The processor 201 is configured to execute the instruction stored in the memory 202, so as to control the receiver 203 to receive a signal and control the transmitter 204 to send a signal. The receiver 203 is configured to receive resource configuration information sent by a network device, where the resource configuration information is used to indicate a first transmission resource corresponding to first transmission, and duration of a transmission resource occupied by one transmission of the first transmission is less than 1 millisecond. The processor 201 is configured to control the receiver 203 and the transmitter 204 to communicate with the network device based on the first transmission resource.

Based on the above, the user equipment in this embodiment may receive the resource configuration information that is sent by the network device and that is used to indicate the first transmission resource corresponding to the first transmission, and communicate with the network device based on the first transmission resource. In this way, a communication delay between the network device and the user equipment can be shortened, user experience can be improved, and performance of a wireless network can be enhanced.

It may be understood that, in this embodiment, the processor 201 may be a CPU, or the processor 201 may be another general purpose processor, a DSP, an ASIC, a FPGA or another programmable logic device, a discrete gate or transistor logic device, a discrete hardware component, or the like. The general purpose processor may be a microprocessor, or the processor may be any conventional processor or the like.

The memory 202 may include a ROM and a RAM and provide an instruction and data for the processor 201. A part of the memory 202 may further include a nonvolatile RAM. For example, the memory 202 may further store information about a device type.

In addition to a data bus, the bus system 205 may include a power bus, a control bus, a status signal bus, and the like. However, for clear description, various types of buses in the diagram are marked as the bus system 205.

In an implementation process, the steps in the foregoing method may be completed by using an integrated logic circuit of hardware in the processor 201 or an instruction in a form of software. The steps of the method disclosed with reference to the embodiment may be directly performed by a hardware processor, or may be performed by using a combination of the hardware in the processor and a software module. The software module may be located in a mature storage medium in the field, such as a RAM, a flash memory, a ROM, a programmable ROM, an electrically-erasable programmable memory, or a register. The storage medium is located in the memory 202. The processor 201 reads information from the memory 202 and completes the steps of the foregoing method in combination with the hardware in the processor 201. To avoid repetition, details are not described herein again.

In an embodiment, the first transmission resource may occupy, in time domain, one or more subframes in a MBSFN subframe set.

In an embodiment, that the processor 201 controls the receiver 203 and the transmitter 204 to communicate with the network device based on the first transmission resource may include:

controlling the receiver 203 to receive first resource indication information sent by the network device; and controlling the transmitter 204 to send uplink data to the network device in a first subframe, in a radio frame, determined according to the first resource indication information, where the first subframe in the radio frame is one of subframes occupied by the first transmission resource.

In an embodiment, the radio frame may further include a subframe used for second transmission. Duration of a transmission resource occupied by one transmission of the second transmission is 1 ms.

In an embodiment, the receiver 203 may be further configured to receive, in a second subframe in the radio frame, feedback information sent by the network device, where the second subframe in the radio frame is one of the subframes occupied by the first transmission resource, and a time interval between the second subframe in the radio frame and the first subframe in the radio frame is greater than or equal to first duration.

In an embodiment, the receiver 203 may be further configured to receive, in a first subframe in the subframe used for the second transmission, feedback information sent by the network device, where a time interval between the first subframe in the subframe used for the second transmission and the first subframe in the radio frame is greater than or equal to second duration.

In an embodiment, when the receiver 203 receives feedback information that is sent by the network device and that indicates that the network device unsuccessfully receives the uplink data, the transmitter 204 may be further configured to:

send retransmission data to the network device at an interval of third duration from a moment at which the feedback information is received; or send retransmission data to the network device in a third subframe in the radio frame, where the third subframe in the radio frame is one of the subframes occupied by the first transmission resource, and a time interval between the third subframe in the radio frame and a subframe used by the receiver 203 to receive the feedback information is greater than or equal to fourth duration.

In an embodiment, that the transmitter 204 sends retransmission data to the network device at an interval of third duration from a moment at which the feedback information is received may include: when the processor 201 determines that the third duration is less than the time interval between the third subframe in the radio frame and the subframe used by the receiver 203 to receive the feedback information, sending, by the transmitter 204, the retransmission data to the network device at the interval of the third duration from the moment at which the feedback information is received.

In an embodiment, that the transmitter 204 sends retransmission data to the network device in a third subframe in the radio frame may include: sending, by the transmitter 204, the retransmission data to the network device in the third subframe in the radio frame when the processor 201 determines that the third duration is greater than or equal to the time interval between the third subframe in the radio frame and the subframe used by the receiver 203 to receive the feedback information.

In an embodiment, that the processor 201 controls the receiver 203 and the transmitter 204 to communicate with the network device based on the first transmission resource may include:

controlling the receiver 203 to receive second resource indication information sent by the network device; and controlling the receiver 203 to receive, in a first subframe that is determined according to the second resource indication information, downlink data sent by the network device, where the first subframe is one of subframes occupied by the first transmission resource.

In an embodiment, that the processor 201 controls the receiver 203 and the transmitter 204 to communicate with the network device based on the first transmission resource may include:

controlling the receiver 203 to receive configuration information sent by the network device; and controlling the transmitter 204 to send a demodulation reference signal (DMRS) to the network device on a transmission resource in the first transmission resource according to the configuration information.

In an embodiment, the configuration information may include at least one of the following information: indication information used to indicate a location of a time domain symbol used by the user equipment to generate the DMRS, indication information used to indicate a frequency domain location at which the user equipment generates the DMRS, or indication information used to indicate transmit power for sending the DMRS by the user equipment.

In an embodiment, that the processor 201 controls the receiver 203 and the transmitter 204 to communicate with the network device based on the first transmission resource may include:

controlling the receiver 203 to receive uplink control channel resource indication information sent by the network device, where the uplink control channel resource indication information indicates a time domain symbol location and a frequency domain location in a first subframe, the time symbol domain location and the frequency domain being both for an uplink control channel related to the first transmission, and the first subframe is one of subframes occupied by the first transmission resource; and controlling the transmitter 204 to send, in the first subframe according to the uplink control channel resource indication information, uplink control information related to the first transmission to the network device.

It may be understood that, the user equipment 200 in this embodiment may correspond to the user equipment 20 in the embodiment, and may correspond to an entity for performing a method in an embodiment. In addition, the foregoing and other operations and/or functions of the modules in the user equipment 200 may be separately used to implement corresponding procedures in FIG. 11 to FIG. 17. For brevity, details are not described herein again.

Based on the above, the user equipment in this embodiment may receive the resource configuration information that is sent by the network device and that is used to indicate the first transmission resource corresponding to the first transmission, and communicate with the network device based on the first transmission resource. In this way, a communication delay between the network device and the user equipment can be shortened, user experience can be improved, and performance of a wireless network can be enhanced.

Figure 37:
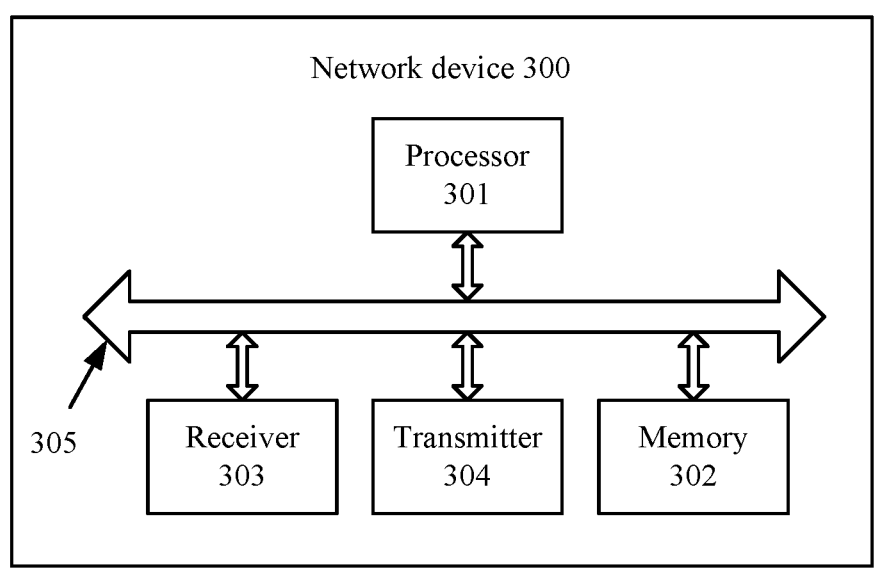
FIG. 37 is a schematic block diagram of a network device according to still another embodiment.

As shown in FIG. 37, an embodiment may further provide a network device 300, where the network device 300 includes a processor 301, a memory 302, a receiver 303, a transmitter 304, and a bus system 305. The bus system 305 is optional. The processor 301, the memory 302, the receiver 303, and the transmitter 304 may be connected by using the bus system 305. The memory 302 is configured to store an instruction. The processor 301 is configured to execute the instruction stored in the memory 302, so as to control the receiver 303 to receive a signal and control the transmitter 304 to send a signal. The transmitter 304 is configured to send configuration information to user equipment. The receiver 303 is configured to receive a DMRS that is generated according to the configuration information and that is sent by the user equipment, where all time domain symbols included in a subframe in which a time domain symbol used by the user equipment to generate the DMRS is located are allocated to M user equipment, and M is an integer not less than 2.

Based on the above, the network device in this embodiment may send the configuration information to the user equipment. All the time domain symbols included in the subframe in which the time domain symbol is located may be allocated to at least two user equipment, where the time domain symbol is used by the user equipment to generate the DMRS according to the configuration information sent by the network device. Therefore, an unnecessary delay in shortened-delay transmission can be avoided, and interference between DMRSs of different user equipment can be reduced.

It may be understood that, in this embodiment, the processor 301 may be a CPU, or the processor 301 may be another general purpose processor, a DSP, an ASIC, a FPGA or another programmable logic device, a discrete gate or transistor logic device, a discrete hardware component, or the like. The general purpose processor may be a microprocessor, or the processor may be any conventional processor or the like.

The memory 302 may include a ROM and a RAM, and provide an instruction and data for the processor 301. A part of the memory 302 may further include a nonvolatile RAM. For example, the memory 302 may further store information about a device type.

In addition to a data bus, the bus system 305 may include a power bus, a control bus, a status signal bus, and the like. However, for clear description, various types of buses in the diagram are marked as the bus system 305.

In an implementation process, the steps in the foregoing method may be completed by using an integrated logic circuit of hardware in the processor 301 or an instruction in a form of software. The steps of the method disclosed with reference to the embodiment may be directly performed by a hardware processor, or may be performed by using a combination of the hardware in the processor and a software module. The software module may be located in a mature storage medium in the field, such as a RAM, a flash memory, a ROM, a programmable ROM, an electrically-erasable programmable memory, or a register. The storage medium is located in the memory 302. The processor 301 reads information from the memory 302 and completes the steps of the foregoing method in combination with the hardware in the processor 301. To avoid repetition, details are not described herein again.

In an embodiment, the DMRS may be mapped, at intervals of N subcarriers, onto a subcarrier on a frequency domain resource corresponding to the time domain symbol used by the user equipment to generate the DMRS, and N is a positive integer.

In an embodiment, N may be a total quantity of time domain symbols occupied by all DMRSs in the subframe in which the time domain symbol used by the user equipment to generate the DMRS is located.

In an embodiment, at least two of the M user equipment may use different time domain symbols to generate a DMRS.

In an embodiment, the M user equipment may include at least two user equipment that are neighboring in terms of time domain resource, and all of the at least two user equipment that are neighboring in terms of time domain resource may use a same time domain symbol to generate a DMRS.

In an embodiment, DMRSs generated by all the user equipment are mapped onto different subcarriers in frequency domain.

In an embodiment, DMRSs generated by all the user equipment are mapped onto a same subcarrier in frequency domain. The transmitter 304 may be further configured to send DMRS transmit power indication information to the user equipment.

That the receiver 303 receives a DMRS that is generated according to the configuration information and that is sent by the user equipment may include: receiving the DMRS that is sent by the user equipment according to the DMRS transmit power indication information.

It may be understood that the network device 300 in this embodiment may correspond to the network device 30 in the embodiment, and may be corresponding to an entity for performing a method in an embodiment. In addition, the foregoing and other operations and/or functions of the modules in the network device 300 may be separately used to implement corresponding procedures in FIG. 18 to FIG. 21. For brevity, details are not described herein again.

Based on the above, the network device in this embodiment may send the configuration information to the user equipment. All the time domain symbols included in the subframe in which the time domain symbol is located may be allocated to at least two user equipment, where the time domain symbol is used by the user equipment to generate the DMRS according to the configuration information sent by the network device. Therefore, an unnecessary delay in shortened-delay transmission can be avoided, and interference between DMRSs of different user equipment can be reduced.

Figure 38:
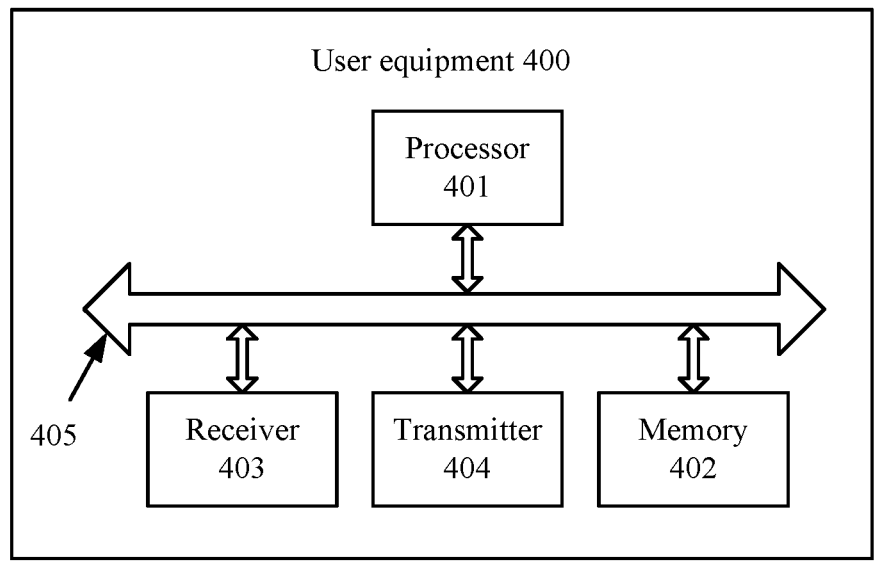
FIG. 38 is a schematic block diagram of user equipment according to still another embodiment.

As shown in FIG. 38, an embodiment may further provide user equipment 400, and the user equipment 400 may include a processor 401, a memory 402, a receiver 403, a transmitter 404, and a bus system 405. The bus system 405 is optional. The processor 401, the memory 402, the receiver 403, and the transmitter 404 may be connected by using the bus system 405. The memory 402 is configured to store an instruction. The processor 401 is configured to execute the instruction stored in the memory 402, so as to control the receiver 403 to receive a signal and control the transmitter 404 to send a signal. The receiver 403 is configured to receive configuration information sent by a network device. The processor 401 is configured to generate a DMRS according to the configuration information, where all time domain symbols included in a subframe in which a time domain symbol used to generate the DMRS is located are allocated to M user equipment, and M is an integer not less than 2. The transmitter 404 is configured to send the DMRS to the network device.

Based on the above, the user equipment in this embodiment may generate the DMRS according to the configuration information received from the network device, and sends the DMRS to the network device. All the time domain symbols included in the subframe in which the time domain symbol is located are allocated to at least two user equipment, where the time domain symbol is used by the user equipment to generate the DMRS according to the configuration information sent by the network device. Therefore, an unnecessary delay in shortened-delay transmission can be avoided, and interference between DMRSs of different user equipment can be reduced.

It may be understood that, in this embodiment, the processor 401 may be a CPU, or the processor 401 may be another general purpose processor, a DSP, an ASIC, a FPGA or another programmable logic device, a discrete gate or transistor logic device, a discrete hardware component, or the like. The general purpose processor may be a microprocessor, or the processor may be any conventional processor or the like.

The memory 402 may include a ROM and a RAM, and provide an instruction and data for the processor 401. A part of the memory 402 may further include a nonvolatile RAM. For example, the memory 402 may further store information about a device type.

In addition to a data bus, the bus system 405 may include a power bus, a control bus, a status signal bus, and the like. However, for clear description, various types of buses in the diagram are marked as the bus system 405.

In an implementation process, the steps in the foregoing method may be completed by using an integrated logic circuit of hardware in the processor 401 or an instruction in a form of software. The steps of the method disclosed with reference to the embodiment may be directly performed by a hardware processor, or may be performed by using a combination of the hardware in the processor and a software module. The software module may be located in a mature storage medium in the field, such as a RAM, a flash memory, a ROM, a programmable ROM, an electrically-erasable programmable memory, or a register. The storage medium is located in the memory 402. The processor 401 reads information from the memory 402, and completes the steps of the foregoing methods in combination with the hardware in the processor 401. To avoid repetition, details are not described herein again.

In an embodiment, the DMRS may be mapped, at intervals of N subcarriers, onto a subcarrier on a frequency domain resource corresponding to the time domain symbol used to generate the DMRS, and N is a positive integer.

In an embodiment, N may be a total quantity of time domain symbols occupied by all DMRSs in the subframe in which the time domain symbol used to generate the DMRS is located.

In an embodiment, at least two of the M user equipment may use different time domain symbols to generate a DMRS.

In an embodiment, the M user equipment may include at least two user equipment that are neighboring in terms of time domain resource, and all of the at least two user equipment that are neighboring in terms of time domain resource use a same time domain symbol to generate a DMRS.

In an embodiment, DMRSs generated by all the user equipment may be mapped onto different subcarriers in frequency domain.

In an embodiment, DMRSs generated by all the user equipment may be mapped onto a same subcarrier in frequency domain. The receiver 403 may be further configured to:

receive DMRS transmit power indication information sent to the network device.

The transmitter 404 may be configured to send the DMRS to the network device according to the DMRS transmit power indication information.

It may be understood that, the user equipment 400 in this embodiment may correspond to the user equipment 40 in the embodiment, and may correspond to an entity for performing a method in an embodiment. In addition, the foregoing and other operations and/or functions of the modules in the user equipment 400 may be separately used to implement corresponding procedures in FIG. 22 and FIG. 23. For brevity, details are not described herein again.

Based on the above, the user equipment in this embodiment may generate the DMRS according to the configuration information received from the network device, and sends the DMRS to the network device. All the time domain symbols included in the subframe in which the time domain symbol is located are allocated to at least two user equipment, where the time domain symbol is used by the user equipment to generate the DMRS according to the configuration information sent by the network device. Therefore, an unnecessary delay in shortened-delay transmission can be avoided, and interference between DMRSs of different user equipment can be reduced.

Figure 39:
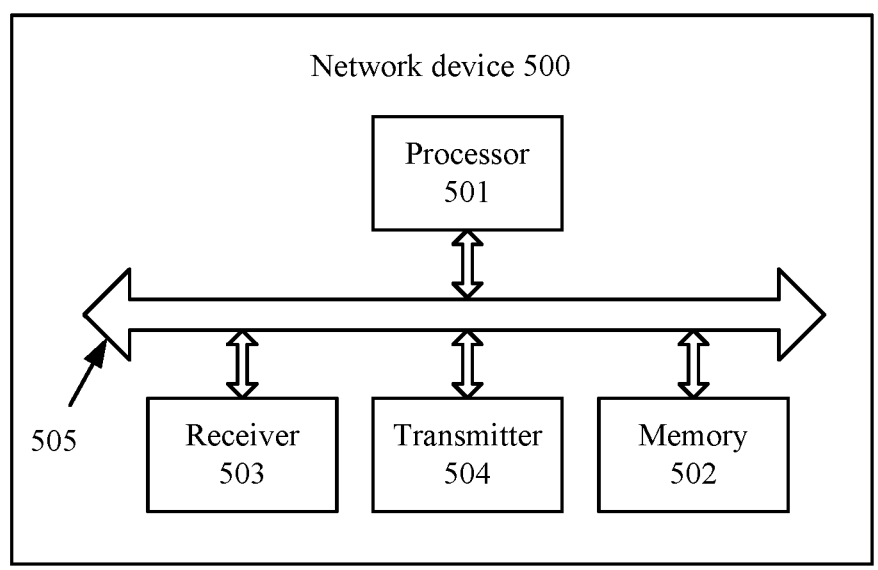
FIG. 39 is a schematic block diagram of a network device according to still another embodiment.

As shown in FIG. 39, an embodiment may further provide a network device 500, and the network device 500 may include a processor 501, a memory 502, a receiver 503, a transmitter 504, and a bus system 505. The bus system 505 is optional. The processor 501, the memory 502, the receiver 503, and the transmitter 504 may be connected by using the bus system 505. The memory 502 is configured to store an instruction. The processor 501 is configured to execute the instruction stored in the memory 502, so as to control the receiver 503 to receive a signal and control the transmitter 504 to send a signal. The transmitter 504 is configured to send resource indication information to user equipment, where the resource indication information is used to indicate a resource occupied by an uplink control channel related to first transmission, and duration of occupying a resource by one transmission of the first transmission is less than 1 ms. The receiver 503 is configured to receive uplink control information that is related to the first transmission and that is sent by the user equipment on the resource occupied by the uplink control channel.

Based on the above, the network device in this embodiment may send, to the user equipment, the resource indication information of the resource occupied by the uplink control channel related to the first transmission, and receive the uplink control information that is related to the first transmission and that is sent by the user equipment on the resource occupied by the uplink control channel. Because the duration of occupying a resource by one transmission of the first transmission is less than 1 ms, a transmission delay can be shortened, user experience can be improved, and network performance can be enhanced.

It may be understood that, in this embodiment, the processor 501 may be a CPU, or the processor 501 may be another general purpose processor, a DSP, an ASIC, a FPGA or another programmable logic device, a discrete gate or transistor logic device, a discrete hardware component, or the like. The general purpose processor may be a microprocessor, or the processor may be any conventional processor or the like.

The memory 502 may include a ROM and a RAM and provide an instruction and data for the processor 501. A part of the memory 502 may further include a nonvolatile RAM. For example, the memory 502 may further store information about a device type.

In addition to a data bus, the bus system 505 may include a power bus, a control bus, a status signal bus, and the like. However, for clear description, various types of buses in the diagram are marked as the bus system 505.

In an implementation process, the steps in the foregoing method may be completed by using an integrated logic circuit of hardware in the processor 501 or an instruction in a form of software. The steps of the method disclosed with reference to the embodiment may be directly performed by a hardware processor, or may be performed by using a combination of the hardware in the processor and a software module. The software module may be located in a mature storage medium in the field, such as a RAM, a flash memory, a ROM, a programmable ROM, an electrically-erasable programmable memory, or a register. The storage medium is located in the memory 502. The processor 501 reads information from the memory 502, and completes the steps of the foregoing method in combination with the hardware in the processor 501. To avoid repetition, details are not described herein again.

In an embodiment, the resource indication information may include information about a number of a subframe in which the resource occupied by the uplink control channel related to the first transmission is located and/or information about a time domain symbol location and a frequency domain location in a subframe that are corresponding to the resource occupied by the uplink control channel related to the first transmission.

In an embodiment, the resource indication information may indicate that the resource occupied by the uplink control channel is Fm first subcarriers on a first subband and Fn second subcarriers on a second subband, the first subband and the second subband are in bandwidth occupied by a PUSCH in a first subframe, and are separated in frequency domain, and Fm and Fn are positive integers.

In an embodiment, the first subband and the second subband may be located at two ends of the bandwidth occupied by the PUSCH.

In an embodiment, Fm may be equal to Fn, and locations of the Fm first subcarriers on the first subband may be the same as or symmetrical with locations of the Fn second subcarriers on the second subband.

In an embodiment, time domain symbols corresponding to the Fm first subcarriers may be the same as time domain symbols corresponding to the Fn second subcarriers.

It may be understood that, the network device 500 in this embodiment may correspond to the network device 50 in the embodiment, and may correspond to an entity for performing a method in an embodiment. In addition, the foregoing and other operations and/or functions of the modules in the network device 500 may be separately used to implement corresponding procedures in FIG. 24. For brevity, details are not described herein again.

Based on the above, the network device in this embodiment may send, to the user equipment, the resource indication information of the resource occupied by the uplink control channel related to the first transmission, and receive the uplink control information that is related to the first transmission and that is sent by the user equipment on the resource occupied by the uplink control channel. Because the duration of occupying a resource by one transmission of the first transmission is less than 1 ms, a transmission delay can be shortened, user experience can be improved, and network performance can be enhanced.

Figure 40:
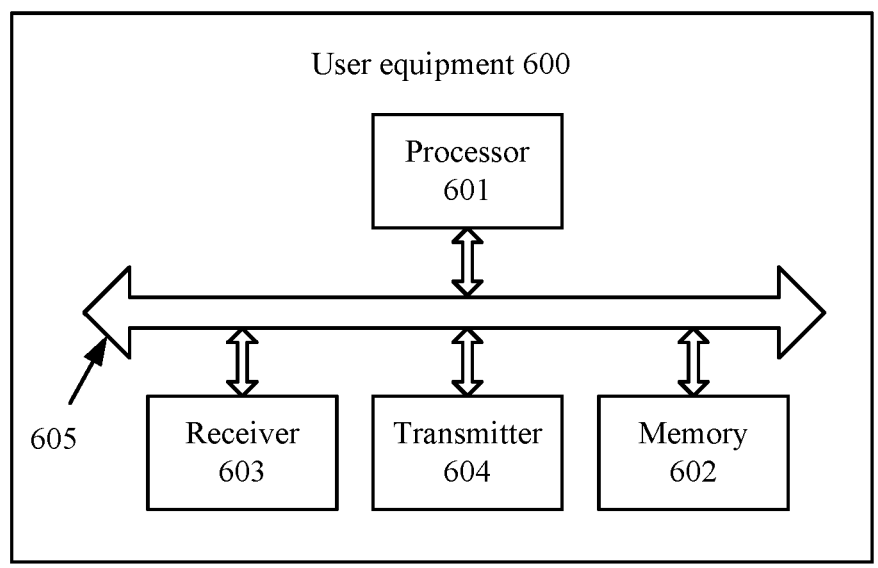
FIG. 40 is a schematic block diagram of user equipment according to still another embodiment.

As shown in FIG. 40, an embodiment may further provide user equipment 600, and the user equipment 600 may include a processor 601, a memory 602, a receiver 603, a transmitter 604, and a bus system 605. The bus system 605 is optional. The processor 601, the memory 602, the receiver 603, and the transmitter 604 may be connected by using the bus system 605. The memory 602 is configured to store an instruction. The processor 601 is configured to execute the instruction stored in the memory 602, so as to control the receiver 603 to receive a signal and control the transmitter 604 to send a signal. The processor 601 is configured to obtain a resource occupied by an uplink control channel related to first transmission, where duration of occupying a resource by one transmission of the first transmission is less than 1 ms. The transmitter 604 is configured to send, on the resource occupied by the uplink control channel related to the first transmission, uplink control information related to the first transmission to a network device.

Based on the above, the user equipment in this embodiment may obtain the resource occupied by the uplink control channel related to the first transmission, and send, on the resource, the uplink control information related to the first transmission to the network device. Because the duration of occupying a resource by one transmission of the first transmission is less than 1 ms, a transmission delay can be shortened, user experience can be improved, and network performance can be enhanced.

It may be understood that, in this embodiment, the processor 601 may be a CPU, or the processor 601 may be another general purpose processor, a digital DSP, an ASIC, a FPGA or another programmable logic device, a discrete gate or transistor logic device, a discrete hardware component, or the like. The general purpose processor may be a microprocessor, or the processor may be any conventional processor or the like.

The memory 602 may include a ROM and a RAM, and provide an instruction and data for the processor 601. A part of the memory 602 may further include a nonvolatile RAM. For example, the memory 602 may further store information about a device type.

In addition to a data bus, the bus system 605 may include a power bus, a control bus, a status signal bus, and the like. However, for clear description, various types of buses in the diagram are marked as the bus system 605.

In an implementation process, the steps in the foregoing method may be completed by using an integrated logic circuit of hardware in the processor 601 or an instruction in a form of software. The steps of the method disclosed with reference to the embodiment may be directly performed by a hardware processor, or may be performed by using a combination of the hardware in the processor and a software module. The software module may be located in a mature storage medium in the field, such as a RAM, a flash memory, a ROM, a programmable ROM, an electrically-erasable programmable memory, or a register. The storage medium is located in the memory 602. The processor 601 reads information from the memory 602, and completes the steps of the foregoing method in combination with the hardware in the processor 601. To avoid repetition, details are not described herein again.

In an embodiment, the receiver 603 may be configured to receive resource indication information sent by the network device.

That the processor 601 obtains a resource occupied by an uplink control channel related to first transmission may include: obtaining, according to the resource indication information, the resource occupied by the uplink control channel related to the first transmission.

In an embodiment, the resource indication information may include information about a number of a subframe in which the resource occupied by the uplink control channel related to the first transmission is located and/or information about a time domain symbol location and a frequency domain location in a subframe that are corresponding to the resource occupied by the uplink control channel related to the first transmission.

In an embodiment, the resource indication information may indicate that the resource occupied by the uplink control channel related to the first transmission is Fm first subcarriers on a first subband and Fn second subcarriers on a second subband, the first subband and the second subband are in bandwidth occupied by a PUSCH in a first subframe, and are separated in frequency domain, and Fm and Fn are positive integers.

In an embodiment, the first subband and the second subband may be located at two ends of the bandwidth occupied by the PUSCH.

In an embodiment, Fm may be equal to Fn, and locations of the Fm first subcarriers on the first subband are the same as or symmetrical with locations of the Fn second subcarriers on the second subband.

In an embodiment, time domain symbols corresponding to the Fm first subcarriers may be the same as time domain symbols corresponding to the Fn second subcarriers.

In an embodiment, that the transmitter 604 sends, on the resource occupied by the uplink control channel related to the first transmission, uplink control information related to the first transmission to a network device may include:

mapping the uplink control information onto the first subband and the second subband by means of mapping first in frequency domain and then in time domain; and sending, on the first subband and the second subband, the uplink control information related to the first transmission to the network device.

It may be understood that, the user equipment 600 in this embodiment may correspond to the user equipment 60 in the embodiment, and may correspond to an entity for performing a method in an embodiment. In addition, the foregoing and other operations and/or functions of the modules in the user equipment 600 may be separately used to implement corresponding procedures in FIG. 26 to FIG. 28. For brevity, details are not described herein again.

Based on the above, the user equipment in this embodiment may obtain the resource occupied by the uplink control channel related to the first transmission, and send, on the resource, the uplink control information related to the first transmission to the network device. Because the duration of occupying a resource by one transmission of the first transmission is less than 1 ms, a transmission delay can be shortened, user experience can be improved, and network performance can be enhanced.

It may be understood that "an embodiment" or "an embodiment" does not mean that particular features, structures, or characteristics related to the embodiment are included in at least one embodiment. Therefore, "in an embodiment" or "in an embodiment" appearing may not necessarily be a same embodiment. In addition, these particular features, structures, or characteristics may be combined in one or more embodiments by using any appropriate manner.

It may be understood that sequence numbers of the foregoing processes do not mean execution sequences in various embodiments. The execution sequences of the processes may be determined according to functions and internal logic of the processes, and may not be construed as any limitation on the implementation processes of the embodiments.

In addition, the terms "system" and "network" may be used interchangeably. It may be understood that the term "and/or" describes only an association relationship for describing associated objects and represents that three relationships may exist. For example, A and/or B may represent the following three cases: Only A exists, both A and B exist, and only B exists. In addition, the character "/" generally indicates an "or" relationship between the associated objects.

It may be understood that in the embodiments, "B corresponding to A" indicates that B is associated with A, and B may be determined according to A. However, it may further be understood that determining A according to B does not mean that B is determined according to A only; that is, B may also be determined according to A and/or other information.

A person of ordinary skill in the art may be aware that, in combination with the examples described in the embodiments, units and algorithm steps may be implemented by electronic hardware, computer software, or a combination thereof. To describe the interchangeability between the hardware and the software, the foregoing has generally described compositions and steps of each example according to functions. Whether the functions are performed by hardware or software depends on particular applications and design constraint conditions of the solutions. A person of ordinary skill in the art may use different methods to implement the described functions for each particular application, but it may not be considered that the implementation goes beyond the scope of the embodiments.

It may be understood by a person of ordinary skill in the art that, for the purpose of convenient and brief description, for a detailed working process of the foregoing system, apparatus, and unit, reference may be made to a corresponding process in the foregoing method embodiments, and details are not described herein again.

In the several embodiments, it may be understood that the disclosed system, apparatus, and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual requirements to achieve the objectives of the solutions of the embodiments.

In addition, functional units in the embodiments may be integrated into one processing unit, or each of the units may exist alone physically, or two or more units are integrated into one unit.

When the integrated unit is implemented in the form of a software functional unit and sold or used as an independent product, the integrated unit may be stored in a computer-readable storage medium. Based on such an understanding, the solutions essentially, or the part contributing to the prior art, or some of the solutions may be implemented in a form of a software product. The software product is stored in a storage medium and includes several instructions for instructing a computer device (which may be a personal computer, a server, a network device, or the like) to perform all or some of the steps of the methods described in the embodiments. The foregoing storage medium may include: any medium that can store program code, such as a USB flash drive, a removable hard disk, a ROM, a RAM, a magnetic disk, or an optical disc.

The foregoing descriptions are merely implementations of the embodiments, but are non-limiting. Any variation or replacement readily figured out by a person of ordinary skill in the art within the scope disclosed shall fall within the protection scope of the embodiments. Therefore, the protection scope of the embodiments shall be subject to the protection scope of the claims.

What is claimed is:

1. A wireless communication method, comprising:
    sending configuration information to user equipment, wherein the configuration information indicates at least two first transmission resources, and duration of each of the at least two first transmission resources is less than 1 millisecond (ms);
    sending first resource indication information to the user equipment, wherein the first resource indication information indicates one first transmission resource of the at least two first transmission resources in a first subframe;

receiving, on the one first transmission resource in the first subframe, uplink data from the user equipment;
sending resource configuration information to the user equipment, wherein the resource configuration information indicates at least two second transmission resources, and duration of each of the at least two second transmission resources is less than 1 millisecond (ms);
sending uplink control channel resource indication information to the user equipment, wherein the uplink control channel resource indication information indicates a time domain symbol location and a frequency domain location of one second transmission resource of the at least two second transmission resources in a second subframe; and
receiving, on the one second transmission resource in the second subframe, uplink control information from the user equipment.

2. The method according to claim 1, wherein the first subframe is within a multimedia broadcast multicast single frequency network (MBSFN) subframes set.

3. The method according to claim 1, further comprising:
sending second resource indication information to the user equipment, wherein the second resource indication information indicates a resource for downlink data in the first subframe; and
sending the downlink data to the user equipment on the resource for downlink data in the first subframe.

4. The method according to claim 1, wherein the configuration information further comprises indication information indicating a time domain symbol location of a demodulation reference signal (DMRS); and the method further comprises:
receiving the DMRS from the user equipment in the first subframe.

5. A wireless communication method, comprising:
receiving configuration information from a network device, wherein the configuration information indicates at least two first transmission resources, wherein a duration of each of the at least two first transmission resources is less than 1 millisecond (ms);
receiving uplink control channel resource indication information from the network device, wherein the uplink control channel resource indication information indicates one first transmission resource of the at least two first transmission resources in a first subframe;
sending, on the one first transmission resource in the first subframe, uplink data to the network device;
receiving resource configuration information from the network device, wherein the resource configuration information indicates at least two second transmission resources, and a duration of each of the at least two second transmission resources is less than 1 millisecond (ms);
receiving uplink control channel resource indication information from the network device, wherein the uplink control channel resource indication information indicates a time domain symbol location and a frequency domain location of one second transmission resource of the at least two second transmission resources in a second subframe; and
sending, on the one second transmission resource in the second subframe, uplink control information to the network device.

6. The method according to claim 5, wherein the first subframe is within a multimedia broadcast multicast single frequency network (MBSFN) subframes set.

7. The method according to claim 5, further comprising:
receiving second resource indication information from the network device, wherein the second resource indication information indicates a resource for downlink data in the first subframe; and
receiving, on the resource for downlink data in a first subframe, downlink data from the network device.

8. The method according to claim 5, wherein the configuration information further comprises indication information indicating a time domain symbol location of a demodulation reference signal (DMRS); and the method further comprises:
sending the DMRS from the user equipment in the first subframe.

9. A device, comprising:
a memory storage comprising instructions; and
one or more processors in communication with the memory storage, wherein the one or more processors execute the instructions to:
send configuration information to user equipment, wherein the configuration information indicates at least two first transmission resources, and duration of each of the at least two first transmission resources is less than 1 millisecond (ms);
send first resource indication information to the user equipment, wherein the first resource indication information indicates one first transmission resource of the at least two first transmission resources in a first subframe;
receive, on the one first transmission resource in the first subframe, uplink data from the user equipment;
send resource configuration information to user equipment, wherein the resource configuration information indicates at least two second transmission resources, and duration of each of the at least two second transmission resources is less than 1 millisecond (ms);
send uplink control channel resource indication information to the user equipment, wherein the uplink control channel resource indication information indicates a time domain symbol location and a frequency domain location of one second transmission resource of the at least two second transmission resources in a second subframe; and
receive, on the one second transmission resource in the second subframe, uplink control information from the user equipment.

10. The device according to claim 9, wherein the first subframe is within a multimedia broadcast multicast single frequency network (MBSFN) subframes set.

11. The device according to claim 9, wherein the one or more processors further execute the instructions to:
send second resource indication information to the user equipment, wherein the second resource indication information indicates a resource for downlink data in the first subframe; and
send the downlink data to the user equipment on the resource for downlink data in the first subframe.

12. The device according to claim 9, wherein the configuration information further comprises indication information indicating a time domain symbol location of a demodulation reference signal (DMRS); and the one or more processors further execute the instructions to:
receive the DMRS from the user equipment in the first subframe.

13. A device, comprising:
a memory storage comprising instructions; and
one or more processors in communication with the memory storage, wherein the one or more processors execute the instructions to:

receive configuration information from a network device, wherein the resource configuration information indicates at least two first transmission resources, wherein a duration of each of the at least two first transmission resources is less than 1 millisecond (ms);

receive uplink control channel resource indication information from the network device, wherein the uplink control channel resource indication information indicates one first transmission resource of the at least two first transmission resources in a first subframe; and send, on the one first transmission resource in the first subframe, uplink data to the network device;

receive resource configuration information from a network device, wherein the resource configuration information indicates at least two second transmission resources, and a duration of each of the at least two second transmission resources is less than 1 millisecond (ms);

receive uplink control channel resource indication information from the network device, wherein the uplink control channel resource indication information indicates a time domain symbol location and a frequency domain location of one second transmission resource of the at least two second transmission resources in a second subframe; and send, on the one second transmission resource in the second subframe, uplink control information to the network device.

14. The device according to claim 13, wherein the first subframe is within a multimedia broadcast multicast single frequency network (MBSFN) subframes set.

15. The device according to claim 13, wherein the method further comprises:

receiving second resource indication information from the network device, wherein the second resource indication information indicates a resource for downlink data in the first subframe; and receiving, on the resource for downlink data in a first subframe, downlink data from the network device.

16. The device according to claim 13, wherein the configuration information further comprises indication information indicating a time domain symbol location of a demodulation reference signal (DMRS); and the one or more processors further execute the instructions to:

send the DMRS from the user equipment in the first subframe.

* * * * *